United States Patent
Gao

(10) Patent No.: US 12,517,214 B2
(45) Date of Patent: Jan. 6, 2026

(54) DETECTION METHOD AND SIGNAL SENDING METHOD AND APPARATUS

(71) Applicant: Shenzhen Yinwang Intelligent Technologies Co., Ltd., Shenzhen (CN)

(72) Inventor: Lei Gao, Beijing (CN)

(73) Assignee: Shenzhen Yinwang Intelligent Technologies Co., Ltd., Shenzhen (CN)

(*) Notice: Subject to any disclaimer, the term of this patent is extended or adjusted under 35 U.S.C. 154(b) by 434 days.

(21) Appl. No.: 17/576,468

(22) Filed: Jan. 14, 2022

(65) Prior Publication Data

US 2022/0137179 A1  May 5, 2022

Related U.S. Application Data

(63) Continuation of application No. PCT/CN2020/077304, filed on Feb. 28, 2020.

(30) Foreign Application Priority Data

Jul. 15, 2019 (CN) .......................... 201910637405.9

(51) Int. Cl.
G01S 7/02 (2006.01)
G01S 7/35 (2006.01)
G01S 13/931 (2020.01)

(52) U.S. Cl.
CPC .............. *G01S 7/0232* (2021.05); *G01S 7/35* (2013.01); *G01S 13/931* (2013.01)

(58) Field of Classification Search
CPC .... G01S 13/931; G01S 13/343; G01S 13/584; G01S 7/023; G01S 7/356; G01S 7/354; G01S 13/42; G01S 13/345; G01S 7/417; G01S 13/426; G01S 7/4008; G01S 7/282; H04B 2001/6912
See application file for complete search history.

(56) References Cited

U.S. PATENT DOCUMENTS

| | | |
|---|---|---|
| 6,452,536 B1 | 9/2002 | Thomassen |
| 9,223,009 B1 | 12/2015 | Wasiewicz et al. |
| 9,673,957 B2 * | 6/2017 | Jöngren ............... H04W 72/23 |
| 9,829,566 B2 * | 11/2017 | Rao ........................... G01S 7/28 |
| 11,644,529 B2 * | 5/2023 | Gulati ................... G01S 13/343 |
| | | 342/173 |
| 2005/0242985 A1 | 11/2005 | Ponsford et al. |
| 2016/0291130 A1 * | 10/2016 | Ginsburg ............... G01S 13/32 |
| 2018/0172813 A1 | 6/2018 | Rao et al. |
| 2018/0252809 A1 * | 9/2018 | Davis ..................... G01S 7/0233 |
| 2018/0348339 A1 | 12/2018 | Lien et al. |
| 2019/0137600 A1 | 5/2019 | Bilik et al. |

(Continued)

FOREIGN PATENT DOCUMENTS

| | | |
|---|---|---|
| CN | 102707266 A | 10/2012 |
| CN | 104502893 A | 4/2015 |

(Continued)

*Primary Examiner* — Olumide Ajibade Akonai
(74) *Attorney, Agent, or Firm* — Leydig, Voit & Mayer, Ltd.

(57) ABSTRACT

A method for a radar that includes at least two transmit antennas and at least one receive antenna includes receiving at least one signal by using the at least one receive antenna, and then, performing a target detection based on the at least one signal, where the at least one signal corresponds to at least two detection information sets.

9 Claims, 13 Drawing Sheets

(56) References Cited

U.S. PATENT DOCUMENTS

| | | | |
|---|---|---|---|
| 2019/0221110 A1* | 7/2019 | Vanderveen | G06V 20/58 |
| 2019/0227156 A1* | 7/2019 | Santra | G01S 13/42 |
| 2019/0265346 A1* | 8/2019 | Hakobyan | G01S 13/343 |
| 2022/0308204 A1* | 9/2022 | Zaidi | G01S 13/426 |

FOREIGN PATENT DOCUMENTS

| | | |
|---|---|---|
| CN | 104502900 A | 4/2015 |
| CN | 106338727 A | 1/2017 |
| CN | 106814358 A | 6/2017 |
| CN | 109407088 A | 3/2019 |
| CN | 109752718 A | 5/2019 |
| CN | 109991577 A | 7/2019 |
| WO | WO-2018106467 A1 * | 6/2018 |
| WO | 2019113517 A1 | 6/2019 |

* cited by examiner

Virtual receiving array including 2*4 virtual receiving units

DETECTION METHOD AND SIGNAL SENDING METHOD AND APPARATUS

CROSS-REFERENCE TO RELATED APPLICATIONS

This application is a continuation of International Application No. PCT/CN2020/077304, filed on Feb. 28, 2020, which claims priority to Chinese Patent Application No. 201910637405.9, filed on Jul. 15, 2019. The disclosures of the aforementioned applications are hereby incorporated by reference in their entireties.

TECHNICAL FIELD

This application relates to the field of radar technologies, and in particular, to a detection method and a signal sending method and apparatus.

BACKGROUND

With the development of science and technology, intelligent vehicles have gradually entered our daily life. An advanced driving assistant system (ADAS) plays a very important role in an intelligent vehicle. In this system, various sensors installed on the vehicle are used to sense an ambient environment and collect data, identify a still object and a moving object, detect and track an object, and perform a system operation and analysis with reference to navigator map data, so that a driver perceives a possible danger in advance, thereby effectively improving driving comfort and safety of the vehicle.

In a driverless architecture, a sensor layer includes a visual system sensor such as an in-vehicle camera and a radar system sensor such as an in-vehicle radar. A millimeter-wave radar is a kind of in-vehicle radar. Because of relatively low costs and relatively mature technologies, the millimeter-wave radar first becomes a main sensor of a driverless system. Currently, more than ten functions of the ADAS have been developed, such as adaptive cruise control (ACC), autonomous emergency braking (AEB), lance change assist (LCA), or blind spot monitoring (BSM) that is implemented based on an in-vehicle millimeter-wave radar.

FIG. 1 is a schematic principle diagram of detecting a target object by a radar. The radar transmits a detection signal (electromagnetic wave) outwards by using an antenna and receives a signal reflected by the target object, amplifies the signal reflected by the target object, and down-converts the signal to obtain information such as a relative distance and a relative speed between a vehicle and the target object, so as to determine a location of the target object.

With widespread use of in-vehicle radars, mutual interference between the in-vehicle radars is becoming increasingly severe. Mutual interference reduces a detection probability or increases a false alarm probability of the in-vehicle radar, affecting driving safety or comfort of the vehicle. Therefore, how to reduce interference between in-vehicle radars is a technical problem that needs to be solved urgently.

SUMMARY

This application provides a detection method and a signal sending method and apparatus, to minimize or avoid interference between radars.

According to a first aspect, a detection method is provided, where the method may be applied to a first radar, the first radar includes at least two transmit antennas and at least one receive antenna, and the method includes: receiving at least one signal by using the at least one receive antenna, and then performing target detection based on the at least one signal, where the at least one signal corresponds to at least two detection information sets, the at least two detection information sets correspond to the at least two transmit antennas, and the at least two detection information sets are used for target detection.

In this embodiment of this application, the method may be performed by a detection apparatus, and the detection apparatus is, for example, a radar detection apparatus. In this solution, the at least one signal received by the at least one receive antenna corresponds to the at least two detection information sets used for target detection, and the at least two detection information sets correspond to the at least two transmit antennas. It may be considered that in this application, the at least two detection information sets corresponding to the at least two transmit antennas are obtained based on the received at least one signal. If a transmit parameter of signal transmission of another radar detection apparatus is different from a transmit parameter of signal transmission of the radar detection apparatus, detection information generated by a radar signal transmitted by the another radar detection apparatus is also different in the at least two detection sets. Therefore, even if the another radar detection apparatus causes interference to the radar detection apparatus, that is, the radar signal transmitted by the another radar detection apparatus may be received by the radar detection apparatus, the radar detection apparatus considers the radar signal as an echo signal, namely, a signal obtained after a signal transmitted by the radar detection apparatus is reflected by a target, in this application, detection information generated due to the interference caused by the another radar detection apparatus can still be eliminated from the at least two detection sets, that is, the interference caused by the another radar detection apparatus to the radar detection apparatus is eliminated. In this manner, mutual interference between radar detection apparatuses can be eliminated.

In a possible design, the performing target detection based on the at least one signal includes:

if at least one empty set exists in the at least two detection information sets, determining that no valid target is detected.

Case 1: There may be no valid target within a maximum detection distance around the radar detection apparatus. For example, the radar detection apparatus is in an open region. Therefore, for this case, if it is determined that at least one empty set exists in the at least two detection information sets, it may be determined that the radar detection apparatus has no valid target. If the radar detection apparatus successively determines the detection information set based on a signal corresponding to each transmit antenna, once it is determined that one empty set exists, subsequent processing is not continued, thereby reducing energy consumption of the radar detection apparatus.

In a possible design, the performing target detection based on the at least one signal includes:

determining a target information set based on the at least two detection information sets;
if the target information set is an empty set, determining that no valid target is detected; and/or
if the target information set is a non-empty set, determining that the target information set indicates at least one valid target, where detection information of the at least one valid target is included in each detection information set of the at least two detection information sets.

Case 2: There may be a valid target around the radar detection apparatus or another radar detection apparatus that causes interference to the radar detection apparatus; or there may be a valid target and another radar detection apparatus. In this case, whether the target information set determined based on the at least two detection information sets is an empty set may be determined, so as to determine whether a valid target exists. If the target information set is an empty set, there is no valid target. If the target information set is a non-empty set, there is a valid target. In this manner, interference between radar detection apparatuses can be eliminated.

In a possible design, the at least one valid target includes a first valid target, and the method further includes:
 determining a first characteristic parameter of the first valid target, where
 values of detection information corresponding to the first characteristic parameter of the first valid target in the at least two detection information sets are the same; or
 a difference between values of detection information corresponding to the first characteristic parameter of the first valid target in the at least two detection information sets is less than a first preset threshold.

In this application, detection information representing a target may be selected from the at least two detection information sets, so as to perform target detection. In consideration that there is an error in detection information that represents a same characteristic of a target, for detection information of a same characteristic parameter of a same target, detection information with a same value or similar values may be selected from the at least two detection information sets in this application, so as to avoid losing a target as far as possible.

In a possible design, the determining a first characteristic parameter of the first valid target includes:
 determining the first characteristic parameter based on the at least one signal and the at least two detection information sets.

For example, if the first characteristic parameter includes an angle of a target relative to the radar detection apparatus, the angle of the target relative to the radar detection apparatus may be determined based on the at least one signal and the at least two detection information sets in this embodiment of in this application, so as to subsequently determine a location of a valid target more accurately.

In another possible design, a detection parameter of the first detection target further includes a second characteristic parameter, and the method further includes:
 determining the second characteristic parameter of the first detection target, where values of detection information corresponding to the second characteristic parameter of the first valid target are the same in the at least two detection information sets; or
 a difference between values of detection information corresponding to the second characteristic parameter of the first valid target in the at least two detection information sets is less than a second preset threshold.

Usually, a detection target has a plurality of detection parameters. In this solution, detection information that represents a target is comprehensively determined from the at least two detection information sets based on the plurality of detection parameters in this application, and detection information of an invalid target can be eliminated as far as possible.

In a possible design, the at least one receive antenna includes at least two receive antennas, the at least one signal includes a plurality of signals, and the method further includes:
 transforming the plurality of signals into a range-Doppler-angle domain to determine detection information.

In this solution, for example, a manner suitable for a radar detection apparatus that includes at least two receive antennas to determine detection information is provided. That is, if the radar detection apparatus includes at least two receive antennas, the detection information may further include angle information of a target relative to the radar detection apparatus.

According to a second aspect, a signal sending method is provided, and the method includes:
 determining a first transmit parameter of a first radar; and
 transmitting a signal based on the first transmit parameter; where
 the first radar includes a plurality of transmit antennas, and the first transmit parameter is used to indicate time intervals and/or sending start moments of signal transmission of the plurality of transmit antennas, or the first transmit parameter is used to indicate frequency spacings and/or frequency domain start locations of signal sending of the plurality of transmit antennas.

In this embodiment of this application, the method may be performed by a detection apparatus. The detection apparatus is, for example, a first radar detection apparatus. The first radar detection apparatus may be a first radar, or may be a communications apparatus communicatively connected to the first radar. In this solution, during signal sending, the first radar detection apparatus may first determine the first transmit parameter. The first transmit parameter may be used to indicate time intervals and/or sending start moments, or frequency spacings and/or frequency domain start locations of signal transmission of a plurality of transmit antennas. In this way, the first transmit parameter of the first radar detection apparatus and a first transmit parameter of another radar detection apparatus can be prevented from being the same or similar. That is, a difference exists between the first transmit parameter of the first radar detection apparatus and the first transmit parameter of the another radar detection apparatus, thereby suppressing interference caused by the another radar detection apparatus to the first radar detection apparatus. In this manner, interference between radar detection apparatuses can be reduced or avoided.

In a possible design, the determining a first transmit parameter of a first radar includes:
 updating the first transmit parameter of the first radar from a first value to a second value.

In some embodiments, if the first radar detection apparatus determines that a value of the first transmit parameter is the same as or similar to a value of a first transmit parameter of another radar detection apparatus, the first radar detection apparatus may update the value of the first transmit parameter, so that an updated value is different from the value of the first transmit parameter of the another radar detection apparatus, thereby suppressing interference caused by the another radar detection apparatus to the first radar detection apparatus.

In a possible design, the method further includes:
 obtaining first information from a first communications apparatus, where
 the first information is used to indicate the first transmit parameter, and/or the first information is used to indicate a second transmit parameter of at least one second radar, and the first transmit parameter is determined based on the second transmit parameter.

In another possible design, the method further includes: sending second information to the first communications apparatus, where the second information includes the first transmit parameter.

The foregoing two solutions describe two implementations in which the first radar detection apparatus updates the value of the first transmit parameter. Manner 1: The first radar detection apparatus may determine, according to an instruction of the first communications apparatus, whether to update the value of the first transmit parameter. For example, the first communications apparatus may send the first information to the first radar detection apparatus. For example, the first information indicates the second value. Then, the first radar detection apparatus updates the value of the first transmit parameter from the first value to the second value. In this manner, the first radar detection apparatus does not need to determine the second value. For another example, the first information may be used to indicate a transmit parameter of a second radar. The first radar detection apparatus determines the second value based on the first information, and then updates the first value to the second value. In this manner, the first radar detection apparatus updates the value of the first transmit parameter based on an actual situation, so that no interference exists between the first radar and a plurality of second radars.

Manner 2: The first radar detection apparatus may report the first transmit parameter, so that the first communications apparatus instructs, based on the first transmit parameter, another radar, for example, a second radar, to update a transmit parameter of the second radar, so that no interference exists between a plurality of radar detection apparatuses.

In a possible design, the first information is further used to indicate at least one of the following information:
location information of the at least one second radar;
orientation information of the at least one second radar; and
an irradiation angle of the at least one second radar.

In some embodiments, the first information may be any combination of the location information, the orientation information, and the irradiation angle of the at least one second radar. In this case, the first radar detection apparatus may determine, based on the first information, whether the value of the first transmit parameter needs to be updated. Therefore, when the value does not need to be updated, the value is not updated, and when the value needs to be updated, the second value may be more accurately determined based on the first information.

In a possible design, the updating the first transmit parameter of the first radar from a first value to a second value includes:
updating the first transmit parameter from the first value to the second value based on a preset adjustment granularity, where the preset adjustment granularity includes one pulse repetition time (PRT), one probe frame, a plurality of consecutive probe frames, or an antenna rotation period.

In this embodiment of this application, the first radar detection apparatus may update the value of the first transmit parameter based on the first information in a plurality of manners. For example, the first radar detection apparatus may update the value based on a plurality of preset adjustment granularities, and update manners are relatively flexible.

According to a third aspect, a signal sending method is provided, where the method may be applied to a first radar, the first radar includes at least three transmit antennas, the at least three transmit antennas include a first transmit antenna, a second transmit antenna, and a third transmit antenna, and the method includes:
determining a first transmit parameter of the first radar; and
sending signals based on the first transmit parameter by using the at least three transmit antennas.

The at least three transmit antennas send signals by using time division multiplexing (TDM), and the first transmit parameter is used to indicate start moments of signal transmission of the at least three transmit antennas. A start moment of signal transmission of the first transmit antenna and a start moment of signal transmission of the second transmit antenna are adjacent in time domain, the start moment of the signal transmission of the second transmit antenna and a start moment of signal transmission of the third transmit antenna are adjacent in time domain, and a time interval between the start moments of the signal transmission of the first transmit antenna and the second transmit antenna is different from a time interval between the start moments of the signal transmission of the second transmit antenna and the third transmit antenna.

Alternatively, the at least three transmit antennas send signals by using frequency division multiplexing (FDM), and the first transmit parameter is used to indicate center frequencies of signal transmission of the at least three transmit antennas. A center frequency of signal transmission of the first transmit antenna and a center frequency of signal transmission of the second transmit antenna are adjacent in frequency, the center frequency of the signal transmission of the second transmit antenna and a center frequency of signal transmission of the third transmit antenna are adjacent in frequency, and a frequency spacing between the center frequencies of the signal transmission of the first transmit antenna and the second transmit antenna is different from a frequency spacing between the center frequencies of the signal transmission of the second transmit antenna and the third transmit antenna.

In this application, a probability that radar signals sent by different radar detection apparatuses have a same time interval or a same frequency spacing can be reduced. In this way, even if the radar signals sent by the different radar detection apparatuses fall into respective effective receiving regions and are considered as received signals by each other for processing, it can still be distinguished which received signals should not be considered as received signals for processing. For example, in this application, it may be determined that time intervals of signal transmission of two transmit antennas adjacent in time domain are variable, that is, are not fixed. Alternatively, in this application, it may be determined that frequency spacings of signal transmission of two transmit antennas adjacent in frequency are variable, that is, are not fixed. In this manner, mutual interference between radar detection apparatuses can be reduced or avoided.

According to a fourth aspect, a radar detection apparatus is provided, where the radar detection apparatus includes at least two transmit antennas and at least one receive antenna, and the radar detection apparatus further includes:
a transceiver unit, configured to receive at least one signal by using the at least one receive antenna; and
a processing unit, configured to perform target detection based on the at least one signal, where the at least one signal corresponds to at least two detection information sets, the at least two detection information sets correspond to the at least two transmit antennas, and the at least two detection information sets are used for target detection.

In a possible design, the processing unit is specifically configured to:
if at least one empty set exists in the at least two detection information sets, determine that no valid target is detected.

In a possible design, the processing unit is specifically configured to:
determine a target information set based on the at least two detection information sets;
if the target information set is an empty set, determine that no valid target is detected; and/or
if the target information set is a non-empty set, determine that the target information set indicates at least one valid target, where detection information of the at least one valid target is included in each detection information set of the at least two detection information sets.

In a possible design, the at least one valid target includes a first valid target, and the processing unit is further configured to:
determine a first characteristic parameter of the first valid target, where
values of detection information corresponding to the first characteristic parameter of the first valid target in the at least two detection information sets are the same; or
a difference between values of detection information corresponding to the first characteristic parameter of the first valid target in the at least two detection information sets is less than a first preset threshold.

In a possible design, the processing unit is specifically configured to:
determine the first characteristic parameter based on the at least one signal and the at least two detection information sets.

In a possible design, a detection parameter of the first detection target further includes a second characteristic parameter, and the processing unit is further configured to:
determine the second characteristic parameter of the first detection target, where values of detection information corresponding to the second characteristic parameter of the first valid target are the same in the at least two detection information sets; or
a difference between values of detection information corresponding to the second characteristic parameter of the first valid target in the at least two detection information sets is less than a second preset threshold.

In a possible design, the at least one receive antenna includes at least two receive antennas, the at least one signal includes a plurality of signals, and the processing unit is further configured to:
transform the plurality of signals into a range-Doppler-angle domain to determine detection information.

For technical effects of the fourth aspect or various possible implementations of the fourth aspect, refer to description of technical effects of the first aspect or corresponding implementations of the first aspect.

According to a fifth aspect, a radar detection apparatus is provided, where the radar detection apparatus includes:
a processing unit, configured to determine a first transmit parameter of a first radar; and
a transceiver unit, configured to transmit a signal based on the first transmit parameter, where the first radar includes a plurality of transmit antennas, and the first transmit parameter is used to indicate time intervals and/or sending start moments of signal transmission of the plurality of transmit antennas, or the first transmit parameter is used to indicate frequency spacings and/or frequency domain start locations of signal sending of the plurality of transmit antennas.

In a possible design, the processing unit is specifically configured to:
update the first transmit parameter of the first radar from a first value to a second value.

In a possible design, the processing unit is further configured to:
obtain first information from a first communications apparatus, where
the first information is used to indicate the first transmit parameter, and/or the first information is used to indicate a second transmit parameter of at least one second radar, and the first transmit parameter is determined based on the second transmit parameter.

In a possible design, the transceiver unit is further configured to:
send second information to the first communications apparatus, where the second information includes the first transmit parameter.

In a possible design, the first information is further used to indicate at least one of the following information:
location information of the at least one second radar;
orientation information of the at least one second radar; and
an irradiation angle of the at least one second radar.

In a possible design, the processing unit is specifically configured to:
update the first transmit parameter from the first value to the second value based on a preset adjustment granularity, where the preset adjustment granularity includes one pulse repetition time (PRT), one probe frame, a plurality of consecutive probe frames, or an antenna rotation period.

For technical effects of the fifth aspect or various possible implementations of the fifth aspect, refer to description of technical effects of the second aspect or corresponding implementations of the second aspect.

According to a sixth aspect, a radar detection apparatus is provided, where the radar detection apparatus includes at least three transmit antennas, the at least three transmit antennas include a first transmit antenna, a second transmit antenna, and a third transmit antenna, and the radar detection apparatus includes:
a processing unit, configured to determine a first transmit parameter of the first radar; and
a transceiver unit, configured to send signals based on the first transmit parameter by using the at least three transmit antennas.

The at least three transmit antennas send signals by using TDM, and the first transmit parameter is used to indicate start moments of signal transmission of the at least three transmit antennas. A start moment of signal transmission of the first transmit antenna and a start moment of signal transmission of the second transmit antenna are adjacent in time domain, the start moment of the signal transmission of the second transmit antenna and a start moment of signal transmission of the third transmit antenna are adjacent in time domain, and a time interval between the start moments of the signal transmission of the first transmit antenna and the second transmit antenna is different from a time interval between the start moments of the signal transmission of the second transmit antenna and the third transmit antenna.

Alternatively, the at least three transmit antennas send signals by using FDM, and the first transmit parameter is used to indicate center frequencies of signal transmission of the at least three transmit antennas. A center frequency of signal transmission of the first transmit antenna and a center frequency of signal transmission of the second transmit antenna are adjacent in frequency, the center frequency of the signal transmission of the second transmit antenna and a center frequency of signal transmission of the third transmit antenna are adjacent in frequency, and a frequency spacing between the center frequencies of the signal transmission of the first transmit antenna and the second transmit antenna is different from a frequency spacing between the center frequencies of the signal transmission of the second transmit antenna and the third transmit antenna.

For technical effects of the sixth aspect or various possible implementations of the sixth aspect, refer to description of technical effects of the third aspect or corresponding implementations of the third aspect.

According to a seventh aspect, another radar detection apparatus is provided, where the radar detection apparatus is, for example, the foregoing radar detection apparatus, the radar detection apparatus includes at least two transmit antennas and at least one receive antenna, the detection apparatus further includes a processor, a transmitter, and a receiver, and the processor, the transmitter, and the receiver are coupled to each other to implement the method described in the first aspect or various possible designs of the first aspect. For example, the radar detection apparatus is a chip disposed in a detection device. For example, the radar detection device is a radar. The transmitter and the receiver are implemented, for example, by using an antenna, a feeder, and a codec in a communications device; or if the radar detection apparatus is a chip disposed in a detection device, the transmitter and the receiver are, for example, a communications interface in the chip, and the communications interface is connected to a radio frequency transceiver component in the detection device, so as to implement information sending and receiving by using the radio frequency transceiver component.

The receiver is configured to receive at least one signal by using the at least one receive antenna; and
    the processor is configured to perform target detection based on the at least one signal, where
    the at least one signal corresponds to at least two detection information sets, the at least two detection information sets correspond to the at least two transmit antennas, and the at least two detection information sets are used for target detection.

In a possible design, the processor is specifically configured to:
    if at least one empty set exists in the at least two detection information sets, determine that no valid target is detected.

In a possible design, the processor is specifically configured to:
    determine a target information set based on the at least two detection information sets;
    if the target information set is an empty set, determine that no valid target is detected; and/or
    if the target information set is a non-empty set, determine that the target information set indicates at least one valid target, where detection information of the at least one valid target is included in each detection information set of the at least two detection information sets.

In a possible design, the at least one valid target includes a first valid target, and the processor is further configured to:
    determine a first characteristic parameter of the first valid target, where
    values of detection information corresponding to the first characteristic parameter of the first valid target in the at least two detection information sets are the same; or
    a difference between values of detection information corresponding to the first characteristic parameter of the first valid target in the at least two detection information sets is less than a first preset threshold.

In a possible design, the processor is specifically configured to:
    determine the first characteristic parameter based on the at least one signal and the at least two detection information sets.

In a possible design, a detection parameter of the first detection target further includes a second characteristic parameter, and the processor is further configured to:
    determine the second characteristic parameter of the first detection target, where values of detection information corresponding to the second characteristic parameter of the first valid target are the same in the at least two detection information sets; or
    a difference between values of detection information corresponding to the second characteristic parameter of the first valid target in the at least two detection information sets is less than a second preset threshold.

In a possible design, the at least one receive antenna includes at least two receive antennas, the at least one signal includes a plurality of signals, and the processor is further configured to:
    transform the plurality of signals into a range-Doppler-angle domain to determine detection information.

For technical effects of the seventh aspect or various possible implementations of the seventh aspect, refer to description of technical effects of the first aspect or corresponding implementations of the first aspect.

According to an eighth aspect, a radar detection apparatus is provided, where the radar detection apparatus is, for example, the foregoing radar detection apparatus. The radar detection apparatus includes a processor, a transmitter, and a receiver, and the processor, the transmitter, and the receiver are coupled to each other to implement the method described in the second aspect or various possible designs of the second aspect. For example, the detection apparatus is a chip disposed in a detection device. For example, the detection device is a radar. The transmitter and the receiver are implemented, for example, by using an antenna, a feeder, and a codec in a communications device; or if the detection apparatus is a chip disposed in a detection device, the transmitter and the receiver are, for example, a communications interface in the chip, and the communications interface is connected to a radio frequency transceiver component in the detection device, so as to implement information sending and receiving by using the radio frequency transceiver component.

The processor is configured to determine a first transmit parameter of a first radar; and
    the transmitter is configured to transmit a signal based on the first transmit parameter; where
    the first radar includes a plurality of transmit antennas, and the first transmit parameter is used to indicate time intervals and/or sending start moments of signal transmission of the plurality of transmit antennas, or the first transmit parameter is used to indicate frequency spacings and/or frequency domain start locations of signal sending of the plurality of transmit antennas.

In a possible design, the processor is specifically configured to:

update the first transmit parameter of the first radar from a first value to a second value.

In a possible design, the processor is further configured to:

obtain first information from a first communications apparatus, where the first information is used to indicate the first transmit parameter, and/or the first information is used to indicate a second transmit parameter of at least one second radar, and the first transmit parameter is determined based on the second transmit parameter.

In a possible design, the transmitter is further configured to:

send second information to the first communications apparatus, where the second information includes the first transmit parameter.

In a possible design, the first information is further used to indicate at least one of the following information:

location information of the at least one second radar;
orientation information of the at least one second radar; and
an irradiation angle of the at least one second radar.

In a possible design, the processor is specifically configured to:

update the first transmit parameter from the first value to the second value based on a preset adjustment granularity, where the preset adjustment granularity includes one pulse repetition time (PRT), one probe frame, a plurality of consecutive probe frames, or an antenna rotation period.

For technical effects of the eighth aspect or various possible implementations of the eighth aspect, refer to description of technical effects of the second aspect or corresponding implementations of the second aspect.

According to a ninth aspect, a radar detection apparatus is provided, where the radar detection apparatus includes at least three transmit antennas, and the at least three transmit antennas include a first transmit antenna, a second transmit antenna, and a third transmit antenna. The radar detection apparatus is, for example, the foregoing radar detection apparatus. The radar detection apparatus includes a processor, a transmitter, and a receiver, and the processor, the transmitter, and the receiver are coupled to each other to implement the method described in the third aspect or various possible designs of the third aspect. For example, the detection apparatus is a chip disposed in a detection device. For example, the detection device is a radar. The transmitter and the receiver are implemented, for example, by using an antenna, a feeder, and a codec in a communications device; or if the detection apparatus is a chip disposed in a detection device, the transmitter and the receiver are, for example, a communications interface in the chip, and the communications interface is connected to a radio frequency transceiver component in the detection device, so as to implement information sending and receiving by using the radio frequency transceiver component.

The processor is configured to determine a first transmit parameter of the first radar; and the transmitter is configured to send signals based on the first transmit parameter by using the at least three transmit antennas.

The at least three transmit antennas send signals by using TDM, and the first transmit parameter is used to indicate start moments of signal transmission of the at least three transmit antennas. A start moment of signal transmission of the first transmit antenna and a start moment of signal transmission of the second transmit antenna are adjacent in time domain, the start moment of the signal transmission of the second transmit antenna and a start moment of signal transmission of the third transmit antenna are adjacent in time domain, and a time interval between the start moments of the signal transmission of the first transmit antenna and the second transmit antenna is different from a time interval between the start moments of the signal transmission of the second transmit antenna and the third transmit antenna.

Alternatively, the at least three transmit antennas send signals by using FDM, and the first transmit parameter is used to indicate center frequencies of signal transmission of the at least three transmit antennas. A center frequency of signal transmission of the first transmit antenna and a center frequency of signal transmission of the second transmit antenna are adjacent in frequency, the center frequency of the signal transmission of the second transmit antenna and a center frequency of signal transmission of the third transmit antenna are adjacent in frequency, and a frequency spacing between the center frequencies of the signal transmission of the first transmit antenna and the second transmit antenna is different from a frequency spacing between the center frequencies of the signal transmission of the second transmit antenna and the third transmit antenna.

For technical effects of the ninth aspect or various possible implementations of the ninth aspect, refer to description of technical effects of the third aspect or corresponding implementations of the third aspect.

According to a tenth aspect, still another radar detection apparatus is provided. The radar detection apparatus may be the radar detection apparatus in the design of in the foregoing method. For example, the radar detection apparatus is a chip disposed in a detection device. For example, the detection device is a radar. The radar detection apparatus includes a memory, configured to store computer executable program code; and a processor, where the processor is coupled to the memory. The program code stored in the memory includes an instruction. When a processor executes the instruction, the radar detection apparatus or a device on which the radar detection apparatus is installed performs the method in the first aspect or any possible implementation of the first aspect, or the radar detection apparatus or a device on which the radar detection apparatus is installed performs the method in the second aspect or any possible implementation of the second aspect, or the radar detection apparatus or a device on which the radar detection apparatus is installed performs the method in the third aspect.

The radar detection apparatus may further include a communications interface. The communications interface may be a transceiver in the detection device, and is, for example, implemented by using an antenna, a feeder, and a codec in the radar detection apparatus; or if the radar detection apparatus is a chip disposed in the detection device, the communications interface may be an input/output interface of the chip, for example, an input/output pin.

According to an eleventh aspect, a communications system is provided, where the communications system may include, for example, one or more radar detection apparatuses according to the first aspect, the second aspect, or the third aspect, or the communications system may further include another communications apparatus, such as a central node, or may further include a target object.

According to a twelfth aspect, a computer storage medium is provided, where the computer readable storage medium stores an instruction. When the instruction runs on a computer, the computer performs the method in the first aspect or any possible design of the first aspect; or the computer performs the method in the second aspect or any possible design of the second aspect; or the computer performs the method in the third aspect.

According to a seventh aspect, a computer program product including an instruction is provided, where the computer program product stores an instruction. When the instruction runs on a computer, the computer performs the method in the first aspect or any possible design of the first aspect; or the computer performs the method in the second aspect or any possible design of the second aspect; or the computer performs the method in the third aspect.

The embodiments of this application provide a solution for a radar detection apparatus to detect a target. In this solution, the radar detection apparatus can eliminate detection information generated by another detection apparatus due to interference, that is, eliminate interference caused by the another detection apparatus to the radar detection apparatus. In this manner, mutual interference between radar detection apparatuses can be eliminated.

DESCRIPTION OF EMBODIMENTS

Figure 1:
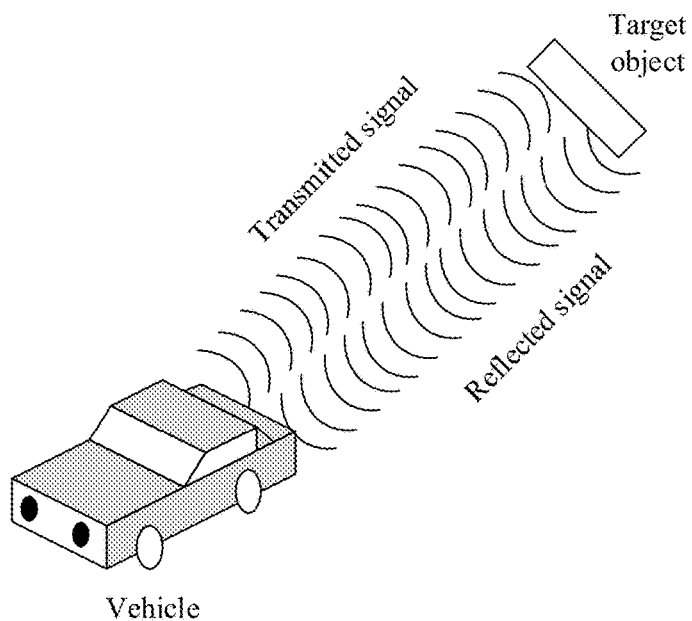
FIG. 1 is a schematic principle diagram of detecting a target object by a radar according to an embodiment of this application.

Embodiments of this application are described in detail with reference to the accompanying drawings of the specification and specific implementations.

In the following, some terms of the embodiments of this application are described, so as to help a person skilled in the art have a better understanding.

(1) A radar detection apparatus, for example, is a radar, or may be another apparatus used for performing detection (for example, ranging).

(2) A radar, or referred to as a radar apparatus, may also be referred to as a detector, a radar detection apparatus, a radar signal sending apparatus, or the like. A working principle of the radar is to detect a corresponding target object by transmitting a signal (or referred to as a sounding signal) and receiving a reflected signal reflected by the target object. The signal transmitted by the radar may be a radar signal, and correspondingly, the received reflected signal reflected by the target object may also be a radar signal.

(3) A transmit period of a radar detection apparatus (or referred to as a frequency sweep period, a frequency sweep time, frequency sweep duration, or the like of the radar detection apparatus) refers to a period in which the radar detection apparatus transmits a radar signal of a complete waveform. The radar detection apparatus usually sends radar signals in a plurality of frequency sweep periods within a continuous period of time.

(4) Initial frequency of a radar detection apparatus. At the beginning of a transmit period, a radar signal is transmitted by the radar detection apparatus at a frequency, which is referred to as the initial frequency of the radar detection apparatus. In addition, a transmit frequency of the radar detection apparatus changes within the transmit period based on the initial frequency.

(5) An irradiation angle may be understood as a half-power beamwidth of a transmit beam of a radar or a scanning range of the transmit beam of the radar. It should be noted herein that the "irradiation angle" is defined for ease of description, and is technically a beamwidth of a transmit beam of a transmit antenna. For example, if the transmit beam is fixed, the irradiation angle is the beamwidth of the transmit beam. If the transmit beam is variable, the irradiation angle is a scanning range of the transmit beam.

(6) Frequency modulated continuous wave (FMCW) is an electromagnetic wave whose frequency varies with time. In the following description, an FMCW radar is used as an example. It should be noted that this application may also be applied to another radar, and a type of the radar is not limited in this application.

(7) Linear frequency modulated continuous wave is an electromagnetic wave whose frequency varies linearly with time. A linear change herein generally refers to a linear change within a transmit period. Specifically, a waveform of the linear frequency modulated continuous wave is usually a sawtooth wave or a triangular wave, or another possible waveform, such as a step frequency waveform.

(8) A maximum ranging distance of a radar detection apparatus, or referred to as a maximum detection distance of the radar detection apparatus, is a parameter related to configuration of the radar detection apparatus (for example, is related to a factory setting parameter of the radar detection apparatus). For example, the radar detection apparatus is a radar, a maximum ranging distance of a long-distance adaptive cruise control (ACC) radar is, for example, 250 m, and a maximum ranging distance of a mid-range radar is, for example, 70 m to 150 m.

(9) Intermediate frequency (IF) signal: For example, a radar detection apparatus is a radar, and a signal obtained after a mixer processes a local-frequency signal of the radar and a reflected signal (a signal obtained after a transmit signal of the radar is reflected by a target object) received by the radar is an intermediate frequency signal. Specifically, a part of a frequency modulated continuous wave signal generated by using an oscillator is used as a local-frequency signal, and a part of the frequency modulated continuous wave signal is used as a transmit signal to be transmitted by using a transmit antenna. A reflected signal that is of the transmit signal and that is received by a receive antenna is mixed with the local-frequency signal to obtain the "intermediate frequency signal". One or more of distance information, speed information, or angle information of the target object may be obtained by using the intermediate frequency signal. The distance information may be distance information of the target object relative to the current radar, the speed information may be a projection of a speed of the target object relative to the current radar in a direction of a connection between the target object and the radar, and the angle information may be angle information of the target object relative to the current radar. Further, a frequency of the intermediate frequency signal is referred to as an intermediate frequency.

(10) "At least one" refers to one or more, and "a plurality of" refers to two or more. The term "and/or" describes an association relationship for describing associated objects and represents that three relationships may exist. For example, A and/or B may represent the following three cases: Only A exists, both A and B exist, and only B exists. The character "I" generally indicates an "or" relationship between the associated objects. "At least one of the following items" or a similar expression means any combination of these items, including a single item or any combination of a plurality of items. For example, at least one of a, b, or c may represent a, b, c, a-b, a-c, b-c, or a-b-c, where a, b, and c may be singular or plural.

In addition, unless otherwise stated, in the embodiments of this application, ordinal numbers such as "first" and "second" are intended to distinguish between a plurality of objects, and are not intended to limit an order, a time sequence, priorities, or importance of the plurality of objects. For example, first information and second information are merely used to distinguish between different information, and are not used to indicate a difference in content, a priority, a sending sequence, or importance of the two types of information.

The foregoing describes some concepts related to the embodiments of this application, and the following describes technical features of the embodiments of this application.

A millimeter wave is an electromagnetic wave whose wavelength is between 1 mm to 10 mm, and a corresponding frequency range is 30 GHz to 300 GHz. In this frequency band, millimeter wave-related characteristics make the millimeter wave very suitable for a vehicle field. Large bandwidth: Rich frequency domain resources and low antenna sidelobes are conducive to imaging or quasi-imaging. Short wavelength: A size and an antenna diameter of a radar device are reduced, and a weight is reduced. Narrow beam: A millimeter wave beam is much narrower than a microwave beam at a same antenna size, and a radar resolution is high. Strong penetration: The millimeter wave is more capable of penetrating smoke, dust, and fog than a laser radar and an optical system, and can work 24 hours×7 days.

Figure 2:
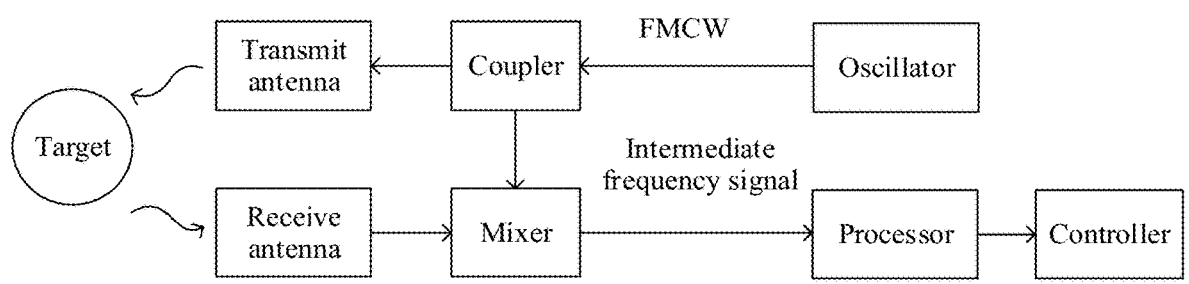
FIG. 2 is a schematic structural diagram of a radar apparatus according to an embodiment of this application.

An in-vehicle millimeter-wave radar system usually includes an oscillator, a transmit antenna, a receive antenna, a mixer, a coupler, a processor, a controller, and the like. FIG. 2 is a working principle diagram of a millimeter-wave radar. The oscillator generates a radar signal whose frequency increases linearly with time. The radar signal is usually a frequency modulated continuous wave. A part of the radar signal is output to the mixer as a local-frequency signal by using a directional coupler, and a part of the radar signal is transmitted by using the transmit antenna. The receive antenna receives a radar signal reflected back after the transmitted radar signal encounters an object in front of a vehicle. The mixer mixes the received radar signal with the local-frequency signal to obtain an intermediate frequency signal. The intermediate frequency signal includes information such as a relative distance, speed, and angle between a target object and the radar system. The intermediate frequency signal is transmitted to the processor after passing through a low-pass filter and being amplified, and the processor processes the received signal. Usually, fast Fourier transform, spectrum analysis, and the like are performed on the received signal, so as to obtain signals such as a distance and a speed of the target object relative to the radar system, and further obtain information such as an angle of the target object relative to the radar system. Finally, the processor may output the obtained information to the controller to control behavior of the vehicle.

Figure 3:
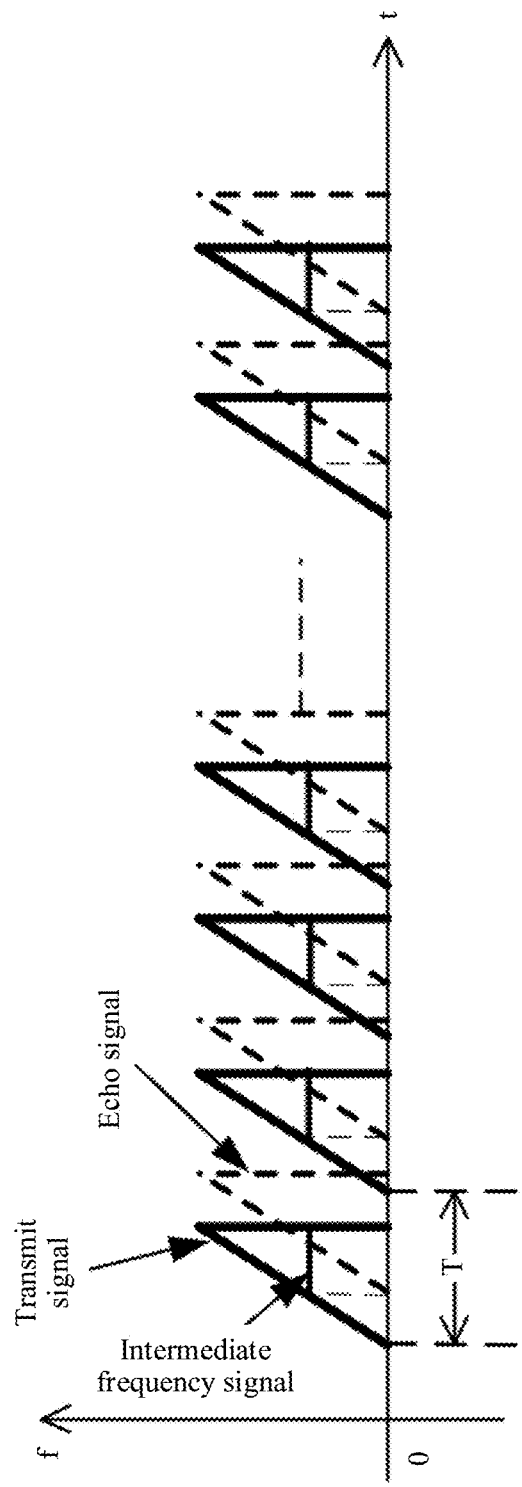
FIG. 3 is a schematic diagram of a transmit signal, an echo signal, and an intermediate frequency signal.

For example, FIG. 3 is a schematic diagram of signal transmission of an FMCW radar. A radar signal generated by an oscillator is a frequency modulated continuous wave. That is, a radar system transmits a group of linear frequency modulated signals with a same waveform and different time starting points by using a transmit antenna. The linear frequency modulated signal may also be referred to as a chirp signal. An interval (represented by T in FIG. 3) at which the chirp signal is transmitted is referred to as a pulse repetition time (PRT). The radar transmits one chirp signal in one PRT, and a time length of the chirp signal is less than or equal to one PRT. Usually, the time length of the chirp signal is less than one PRT. As shown in FIG. 3, the transmit antenna of the radar transmits a signal, and an echo signal received by a receive antenna of the radar refers to a signal transmitted back after the radar signal transmitted by the transmit antenna encounters an object. A mixer mixes the received echo signal with a local-frequency signal to obtain an intermediate frequency signal. Information such as a relative distance and speed between a target object and the radar system can be determined based on the intermediate frequency signal.

For example, when the relative distance and speed between the target object and the radar system are determined based on the intermediate frequency signal, the intermediate frequency signal may be used for the radar signal processing part in each PRT. That is, a sampled and quantized data sequence forms a two-dimensional array, one dimension in the two-dimensional array corresponds to a sampling point sequence number in the PRT, and the other dimension corresponds to a PRT number. Then, Fourier transform is performed on the two-dimensional array to obtain a radar received signal represented by a range-Doppler domain. When an echo component of each target object is represented by using a range-Doppler domain, the echo component corresponds to a two-dimensional sinc function, that is, each target object corresponds to one local peak value in a range-Doppler domain representation. The radar received signal represented by the range-Doppler domain is actually a complex two-dimensional array, and modulo is performed on the complex two-dimensional array point by point to obtain a modulus value corresponding to a local peak value. The local peak value corresponds to sequence numbers of two dimensions, and a frequency of a single-frequency sine wave corresponding to the target object and a phase difference of the intermediate frequency signal in different PRTs may be obtained, so as to obtain distance and speed information of the target object.

Figure 4:
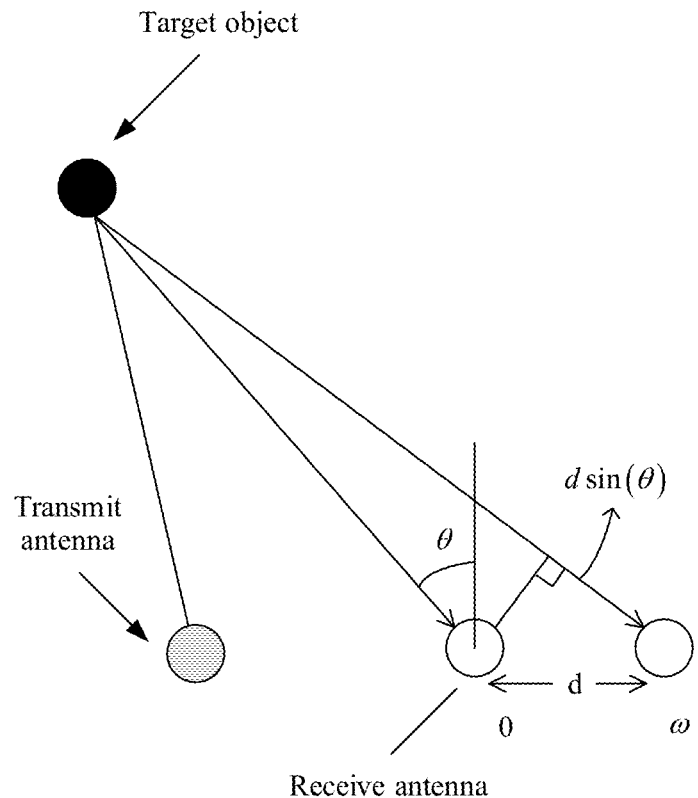
FIG. 4 is a schematic principle diagram of angle measurement of a single-input multiple-output (SIMO) radar.

For a single-input multiple-output (SIMO) radar, that is, a radar that includes one transmit antenna and a plurality of receive antennas, an angle of a target object relative to a radar system may be further determined based on a phase difference between echo signals received by different receive antennas. FIG. 4 is a schematic principle diagram of angle measurement of a SIMO radar. In FIG. 4, for example, the SIMO radar includes one transmit antenna and two receive antennas. In FIG. 4, a signal transmitted by the transmit antenna is reflected by a target object and received by the two receive antennas. A phase difference between the two receive antennas is ω, and a difference between distances from the two receive antennas to the target object is calculated based on the phase difference and a wavelength, that is, dsin(θ) in FIG. 4, where d is a distance between the two receive antennas, and θ is an included angle between the target object and a normal line of the receive antenna. Then, a value of θ can be calculated, that is, an angle of the target object relative to the radar.

Figure 5:
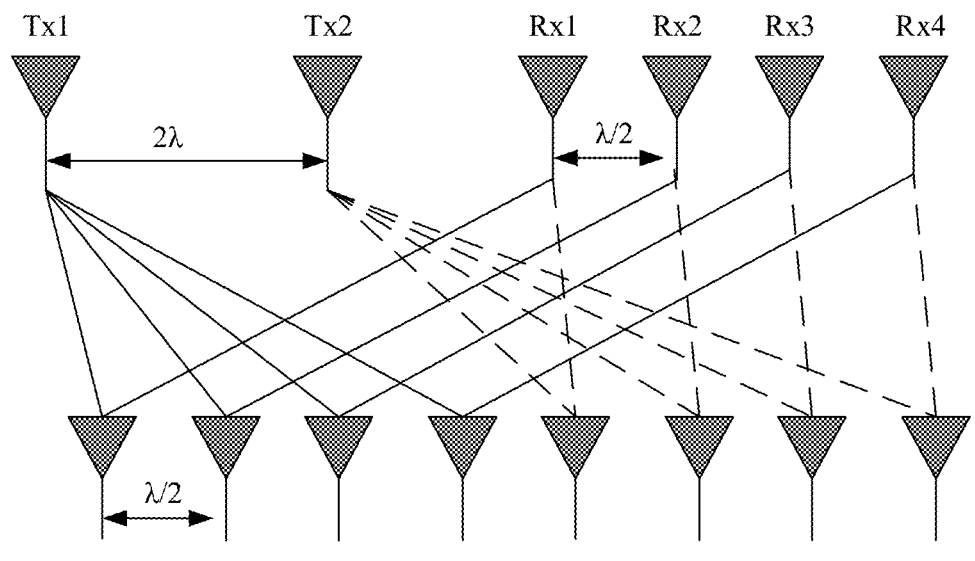
FIG. 5 is a schematic principle diagram of a virtual receiving array of a multiple-input multiple-output (MIMO) radar.

For a multiple-input multiple-output (MIMO) radar, that is, a radar that includes a plurality of transmit antennas and a plurality of receive antennas, signals transmitted by different transmit antennas may have different characteristics, that is, different transmit antennas transmit signals by using different transmit parameters. The transmit parameters herein include, for example, a center frequency, a start time, and a chirp slope. FIG. 5 is a schematic principle diagram of a virtual receiving array of a MIMO radar. FIG. 5 uses an example in which the MIMO radar includes two transmit antennas (Tx1 and Tx2) and four receive antennas (Rx1, Rx2, Rx3, and Rx4). A signal received by each receive antenna is a superposed signal obtained after signals transmitted by all transmit antennas are transmitted by a target object. Each receive antenna may extract, as a received signal of a virtual receiving array element from a received signal based on transmit parameters of signals transmitted by a plurality of transmit antennas, signals respectively from different transmit antennas and reflected by the target object. The virtual receiving array element herein refers to an array element including one transmit antenna and a plurality of receive antennas, that is, M transmit antennas and N receive antennas correspond to received signals of M*N virtual receiving array elements. Therefore, an angle of a SIMO radar of the M*N receiving array elements can be detected by using the M transmit antennas and the N receive antennas.

Figure 6:
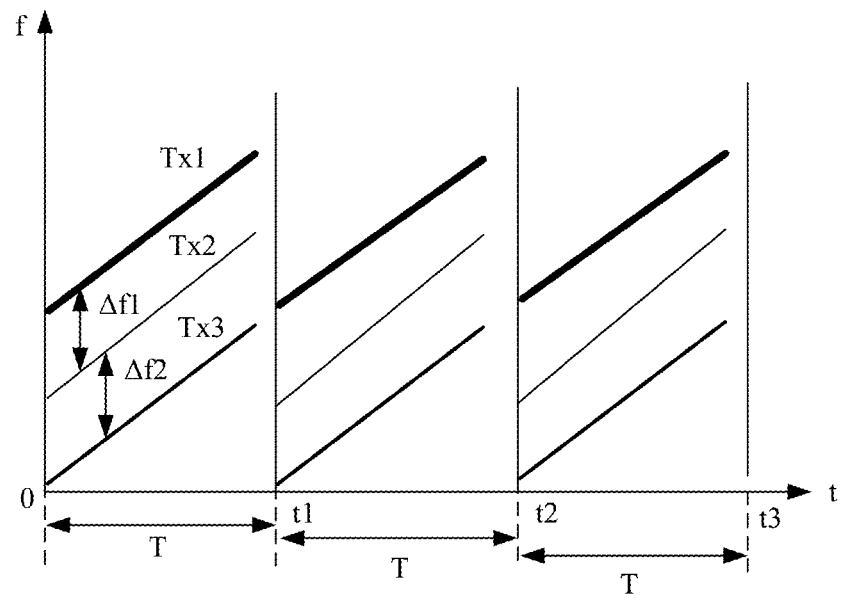
FIG. 6 is a schematic diagram in which a current frequency modulated continuous wave (FMCW) MIMO radar transmits a signal in an FDM mode.

In some embodiments, a MIMO radar may transmit a signal in a frequency division multiplexing (FDM) mode, that is, different transmit antennas transmit signals at different center frequencies. FIG. 6 is a schematic diagram of transmitting a signal by the MIMO radar in the FDM mode. In FIG. 6, a horizontal coordinate t indicates time domain, and a vertical coordinate f indicates frequency domain. In FIG. 6, for example, the MIMO radar includes three transmit antennas. The three transmit antennas are respectively a transmit antenna Tx1, a transmit antenna Tx2, and a transmit antenna Tx3. It can be seen from FIG. 6 that a center frequency of signal transmission of the transmit antenna Tx1 is f1, a center frequency of signal transmission of the transmit antenna Tx2 is f2, and a center frequency of signal transmission of the transmit antenna Tx3 is f3. That is, different transmit antennas transmit signals by using different center frequencies.

Figure 7:
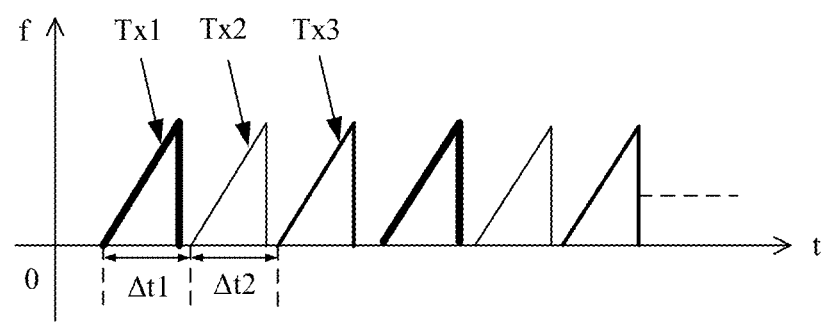
FIG. 7 is a schematic diagram in which a current FMCW MIMO radar transmits a signal in a TDM mode.

Alternatively, in other embodiments, a MIMO radar may transmit a signal in a time division multiplexing (TDM) mode, that is, different transmit antennas transmit signals at different start moments. FIG. 7 is a schematic diagram of transmitting a signal by the MIMO radar in the TDM mode. In FIG. 7, a horizontal coordinate t indicates time domain, and a vertical coordinate f indicates frequency domain. In FIG. 7, for example, the MIMO radar includes three transmit antennas. The three transmit antennas are respectively a transmit antenna Tx1, a transmit antenna Tx2, and a transmit antenna Tx3. It can be seen from FIG. 7 that a start moment of signal transmission of the transmit antenna Tx1 is t1, a start moment of signal transmission of the transmit antenna Tx2 is t2, and a start moment of signal transmission of the transmit antenna Tx3 is t3. That is, different transmit antennas transmit signals by using different start moments.

Frequencies of transmit signals of a plurality of transmit antennas of the current MIMO radar are equally separated, that is, a frequency spacing between any two transmit signals adjacent in frequency domain is fixed. For example, as shown in FIGS. 6, Tx1 and Tx2 are two transmit signals adjacent in frequency, Tx2 and Tx3 are two transmit signals adjacent in frequency, a frequency spacing between Tx1 and Tx2 is Δf1, and a frequency spacing between Tx1 and Tx2 is Δf2.

Alternatively, start moments of transmit signals of a plurality of transmit antennas of the current MIMO radar are equally separated, that is, an interval between start moments of any two transmit signals adjacent in time domain is fixed. For example, as shown in FIGS. 7, Tx1 and Tx2 are two adjacent transmit signals in time domain, Tx2 and Tx3 are two adjacent transmit signals in time domain, an interval between start moments of Tx1 and Tx2 is Δt1, and an interval between start moments of Tx1 and Tx2 is Δt2.

For ease of description, in the following, an interval between start moments of two adjacent transmit signals in time domain is referred to as a time offset, and a frequency spacing between two adjacent transmit signals in frequency domain is referred to as a frequency offset.

If another radar exists around a radar, a signal transmitted by the another radar may be received by the radar, that is, signals received by the radar include the signal transmitted by the another radar in addition to an echo signal. In this case, the radar uses the signal transmitted by the another radar as the echo signal. As a result, when detection is performed on a target based on the received signal, a determined target may actually not exist. In this case, it may be understood that the another radar causes interference to the radar.

Figure 8:
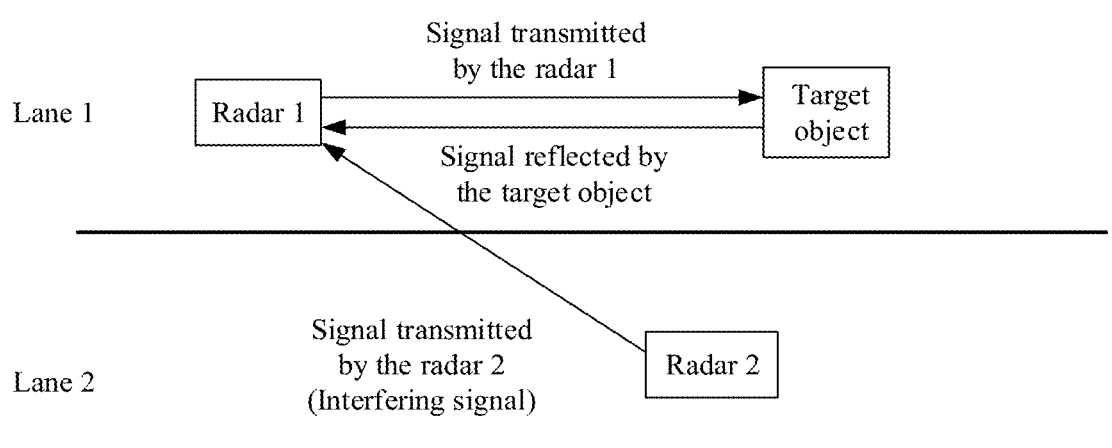
FIG. 8 is a schematic diagram of mutual interference between in-vehicle radars.

For ease of understanding, for example, the radar detection apparatus is an in-vehicle radar. FIG. 8 is a schematic diagram of mutual interference between in-vehicle radars. A radar 1 sends a transmit signal and receives a reflected signal that is of the transmit signal and that is reflected from a target object. When the radar 1 receives the reflected signal, a receive antenna of the radar 1 also receives a transmit signal or a reflected signal of a radar 2. Then, the transmit signal or the reflected signal of the radar 2 that is received by the radar 1 is an interference signal for the radar 1. Mutual interference between in-vehicle radars greatly reduces a radar detection probability or increases a false alarm probability of radar detection, and affects driving safety or comfort. Therefore, how to reduce or suppress the interference between in-vehicle radars is a problem that needs to be solved.

To resolve the foregoing problem, this application may determine that different radars transmit signals by using different transmit parameters, where the transmit parameter of the radar includes a center frequency, a start time, a chirp slope, a time offset, a frequency offset, and the like of signal transmission. In this way, signals transmitted by different radars have different characteristics, so that when a radar detects a target based on a received signal, interference from another radar can be eliminated.

Figure 9:
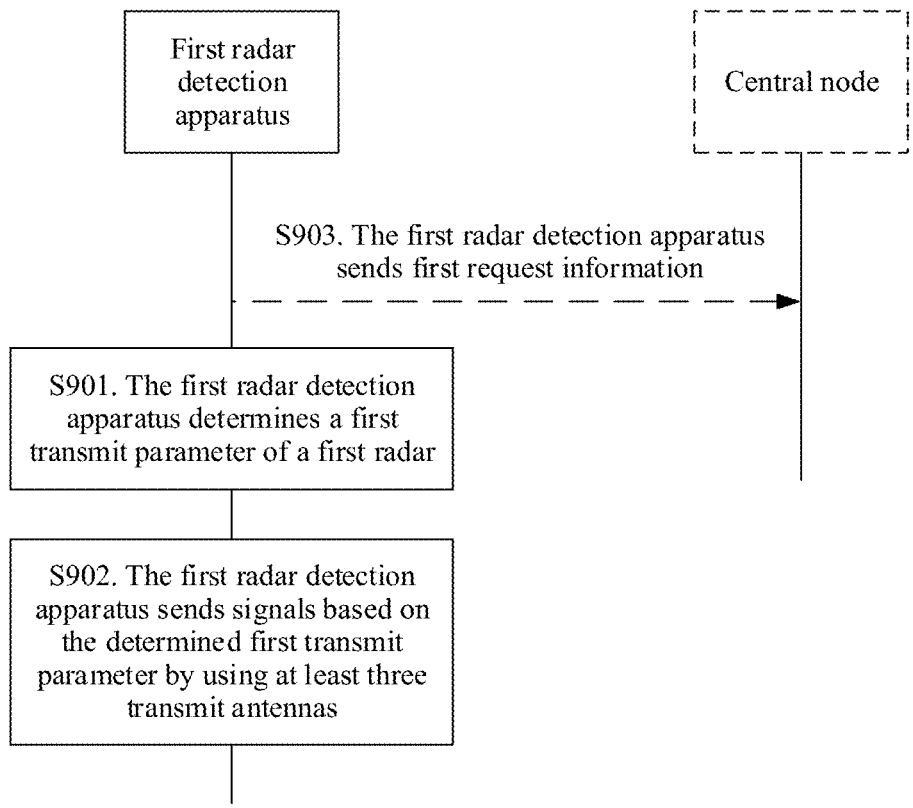
FIG. 9 is a flowchart of a radar signal sending method according to an embodiment of this application.

In a possible solution, an embodiment of this application provides a signal sending method. FIG. 9 is a flowchart of the method. The method provided in the embodiment shown in FIG. 9 may be performed by a radar detection apparatus. The radar detection apparatus may be a radar chip. For example, the radar detection apparatus is referred to as a first radar, or the radar detection apparatus may be a communications apparatus communicatively connected to a radar. In addition, in the following description process, all signals sent by the radar detection apparatus may be radar signals, and naturally, received echo signals may also be radar signals.

S901. A first radar detection apparatus determines a first transmit parameter of the first radar.

The first radar includes at least three transmit antennas, and the first transmit parameter may include a center frequency, a start time, a chirp slope, an initial phase of each transmit pulse, a time offset, a frequency offset, and the like of signal transmission of the first radar.

In some embodiments, if the at least three transmit antennas send signals by using TDM, the first transmit parameter may be used to indicate start moments of transmit signals of the at least three transmit antennas. It may also be understood that the first transmit parameter may be used to indicate time domain start locations of signal transmission of the at least three transmit antennas, or time domain resources occupied by the at least three transmit antennas to transmit signals. For example, the first radar detection apparatus may determine that time offsets of signal transmission of the at least three transmit antennas are different, that is, start moments (time domain start locations) of signal transmission of a plurality of transmit antennas are not divided equally in time domain.

Figure 10:
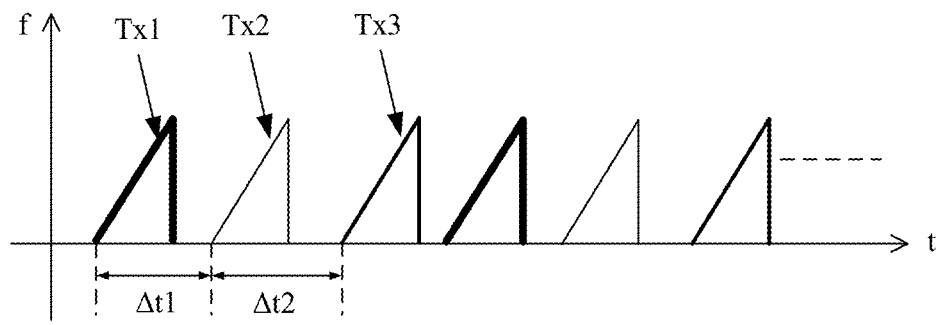
FIG. 10 is a schematic diagram in which an FMCW MIMO radar transmits a signal in a TDM mode according to an embodiment of this application.

For example, FIG. 10 is a schematic diagram of a possible solution. FIG. 10 uses an example in which the first radar includes a first transmit antenna Tx1, a second transmit antenna Tx2, and a third transmit antenna Tx3. A start moment of signal transmission of the first transmit antenna Tx1 and a start moment of signal transmission of the second transmit antenna Tx2 are adjacent in time domain, and the start moment of signal transmission of the second transmit antenna Tx2 and a start moment of signal transmission of the third transmit antenna Tx3 are adjacent in time domain. A time interval $\Delta t1$ between the start moment of signal transmission of the first transmit antenna Tx1 and the start moment of signal transmission of the second transmit antenna Tx2 is different from a time interval $\Delta t2$ between the start moment of signal transmission of the second transmit antenna Tx2 and the start moment of signal transmission of the third transmit antenna Tx3.

In some other embodiments, if the at least three transmit antennas send signals by using FDM, the first transmit parameter may be used to indicate center frequencies of transmit signals of the at least three transmit antennas. It may also be understood that the first transmit parameter may be used to indicate frequency domain configurations of signal transmission of the at least three transmit antennas, or frequency domain resources occupied by the at least three transmit antennas to transmit signals. For example, the first radar detection apparatus may determine that frequency domain offsets of signal transmission of the at least three transmit antennas are different, that is, center frequencies of signal transmission of a plurality of transmit antennas are not divided equally in frequency domain.

Figure 11:
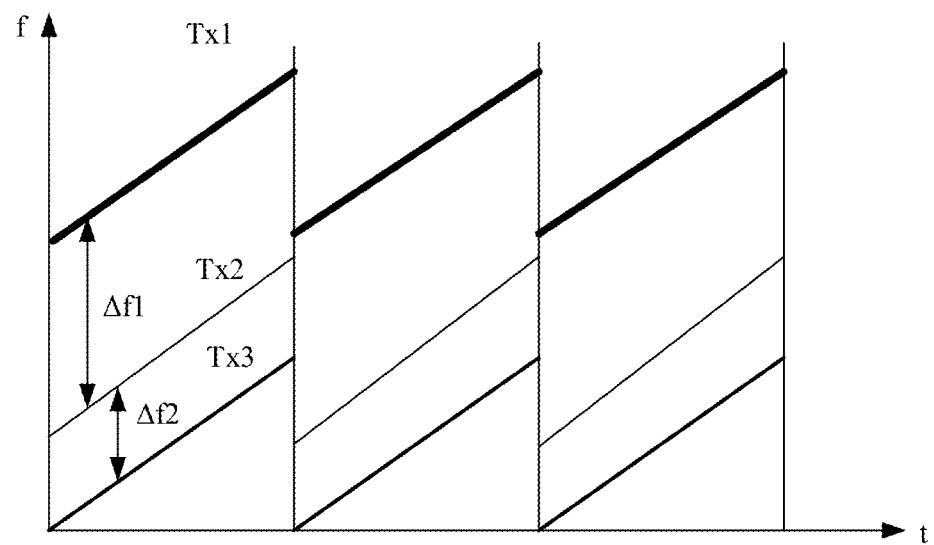
FIG. 11 is a schematic diagram in which an FMCW MIMO radar transmits a signal in an FDM mode according to an embodiment of this application.

For example, FIG. 11 is a schematic diagram of a possible solution. FIG. 11 uses an example in which the first radar includes a first transmit antenna Tx1, a second transmit antenna Tx2, and a third transmit antenna Tx3. A center frequency of signal transmission of the first transmit antenna Tx1 and a center frequency of signal transmission the second transmit antenna Tx2 are adjacent in frequency domain, and the center frequency of signal transmission of the second transmit antenna Tx2 and a center frequency of signal transmission of the third transmit antenna Tx3 are adjacent in frequency domain. A frequency spacing $\Delta f1$ between the center frequency of signal transmission of the first transmit antenna Tx1 and the center frequency of signal transmission of the second transmit antenna Tx2 is different from a frequency spacing $\Delta f2$ between the center frequency of signal transmission of the second transmit antenna Tx2 and the center frequency of signal transmission of the third transmit antenna Tx3.

Because a time interval between signal transmission of two transmit antennas of the first radar that are adjacent to each other in time domain is variable, or a frequency spacing between signal transmission of two transmit antennas of the first radar that are adjacent to each other in frequency domain is variable, different transmit antennas of the first radar that transmit signals occupy not completely same time-frequency resources. In this application, mutual interference between different radars can be eliminated based on different time-frequency resources occupied by different transmit antennas of the first radar.

For example, two radars exist. The two radars are respectively a radar 1 and a radar 2. When the radar 1 and the radar 2 transmit signals, because a time interval between transmit signals of two adjacent transmit antennas in time domain is variable, or a frequency spacing between transmit signals of two adjacent transmit antennas in frequency domain is variable, a probability that the radar 1 and the radar 2 transmit signals by using a same time domain parameter or frequency domain parameter is reduced, thereby reducing mutual interference between different radars.

Because the radar 1 and the radar 2 transmit signals by using different time domain parameters or frequency parameters, a signal characteristic of the radar 1 is inconsistent with a signal characteristic of the radar 2. Therefore, even if the radar 1 receives a signal of the radar 2, because the signal characteristics are inconsistent, when the radar 1 can detect a target based on the received signal, interference from the radar 2 is eliminated, that is, interference from the radar 2 to radar 1 is reduced or avoided.

As described above, for example, the first transmit parameter is a time interval and a frequency spacing between transmit signals of two adjacent transmit antennas. In a possible design, the first transmit parameter may alternatively be a chirp slope, a transmit period, or the like, provided that the parameter makes the transmit signals of the radar 1 and the radar 2 have different characteristics.

In some embodiments, the first transmit parameter may be a locally stored parameter, or may be a remotely stored parameter. For example, the first transmit parameter is stored in a storage unit of the first radar. In this case, when determining the first transmit parameter of the first radar, the first radar detection apparatus may obtain the first transmit parameter from the storage unit. For another example, the first transmit parameter is stored on a central node (a server). In this case, the first radar detection apparatus may request the first transmit parameter from the central node. For example, in step S903, the first radar detection apparatus sends first request information to the central node to request the first transmit parameter. This embodiment of this application sets no limitation on how the first radar detection apparatus determines the first transmit parameter. The central node and step S903 are not indispensable. Therefore, they are indicated by using dashed lines in FIG. 9.

S902. The first radar detection apparatus sends signals based on the determined first transmit parameter by using the at least three transmit antennas.

After determining the first transmit parameter, the first radar detection apparatus may instruct the first radar to send a signal based on the first transmit parameter. Alternatively, the first radar detection apparatus is the first radar, so that the first radar detection apparatus determines the first transmit parameter and sends a signal based on the first transmit parameter.

For example, the first transmit parameter is used to indicate that a time interval between transmit signals of two transmit antennas of the first radar that are adjacent in time domain is variable, or the first transmit parameter is used to indicate that a frequency spacing between transmit signals of two transmit antennas that are adjacent in frequency domain is variable. Therefore, different transmit antennas of the first radar that transmit signals occupy not completely same time-frequency resources. Based on different time-frequency resources occupied by different transmit antennas of the first radar, mutual interference between different radars can be eliminated in this application.

Alternatively, there is a possible solution to reduce or avoid interference between radars. In a process of using a radar, a transmit parameter of the radar may be adjusted. For example, a value of the transmit parameter of the radar is adjusted to be different from a value of a transmit parameter of another radar.

In this case, that the first radar detection apparatus determines the first transmit parameter may also be understood as that the first radar detection apparatus determines a value of the first transmit parameter. For example, the first radar detection apparatus determines a value of a center frequency of signal transmission of each transmit antenna.

Figure 12:
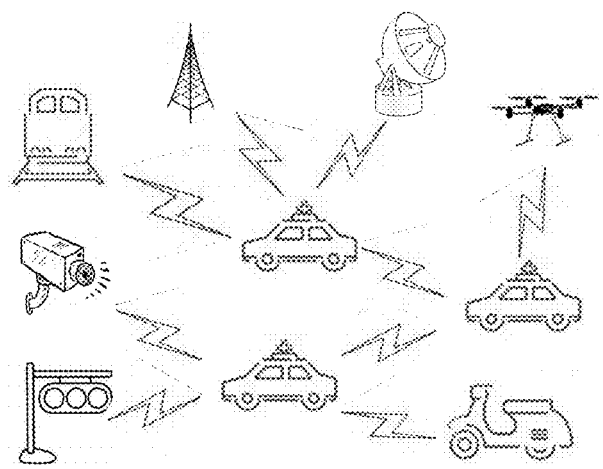
FIG. 12 is a schematic diagram of a possible application scenario according to an embodiment of this application.
Figure 13:
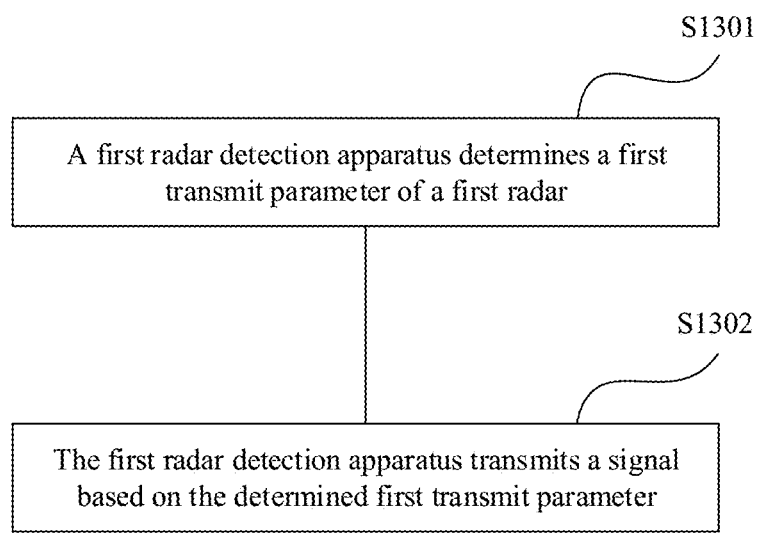
FIG. 13 is a flowchart of a radar signal sending method according to an embodiment of this application.

For ease of understanding, the following describes how the first radar detection apparatus determines the value of the first transmit parameter with reference to FIG. 12 and FIG. 13.

FIG. 12 is a schematic diagram of a possible application scenario according to an embodiment of this application. The application scenario may be driverless driving, self-driving, intelligent driving, connected driving, or the like. The radar detection apparatus may be installed in a motor vehicle (such as an unmanned vehicle, an intelligent vehicle, an electric vehicle, or a digital vehicle), an unmanned aerial vehicle, a rail vehicle, a bicycle, a traffic light, a speed measurement apparatus, a network device (such as a base station or a terminal device in various systems), or the like. This embodiment of this application is applicable to not only radar detection apparatuses between vehicles, but also radar detection apparatuses between vehicles and other apparatuses such as unmanned aerial vehicles, or radar detection apparatuses between other apparatuses. In addition, the radar detection apparatus may be installed on a mobile device, for example, installed on a vehicle as an in-vehicle radar detection apparatus, or may be installed on a fixed device, for example, installed on a device such as a road side unit (RSU). This embodiment of this application sets no limitation on an installation location, a function, and the like of the radar detection apparatus.

This embodiment of this application may be performed by a detection apparatus. For example, a detection apparatus that performs the method provided in this embodiment of this application may be referred to as a first detection apparatus. The first detection apparatus may be a radar detection apparatus, for example, a radar chip, or may be a communications apparatus that communicates with a radar, for example, an in-vehicle communications apparatus. For ease of description, in most cases in the following embodiments of this application, that a detection apparatus is a radar detection apparatus, and the radar detection apparatus is a radar such as a millimeter-wave radar is used as an example for description and explanation of the embodiments. However, it is not limited in the embodiments of this application that the detection apparatus is only a radar detection apparatus, and the radar detection apparatus is only a millimeter-wave radar or a radar. In addition, a signal sent by the detection apparatus may be a radio signal. For example, if the detection apparatus is a radar detection apparatus, it may be considered that a signal sent by the detection apparatus is a radar signal. In this embodiment of this application, for example, the detection apparatus is a radar detection apparatus, and a signal sent by the detection apparatus is a radar signal.

FIG. 13 is a flowchart of a signal sending method according to an embodiment of this application. In the following description process, an example in which the method is applied to the scenario shown in FIG. 12 is used. The method provided in the embodiment shown in FIG. 13 may be performed by the radar detection apparatus in the scenario shown in FIG. 12. For example, the radar detection apparatus is referred to as a first radar detection apparatus or a first radar.

S1301. The first radar detection apparatus determines a first transmit parameter of the first radar.

S1302. The first radar detection apparatus transmits a signal based on the determined first transmit parameter.

In step S1301, if another radar, such as a second radar, exists within a detection range of the first radar, that is, within a maximum ranging distance of the first radar, and the second radar and the first radar belong to a same category, the second radar may cause interference to the first radar. For example, a time at which the first radar receives an echo signal is exactly a time at which the first radar receives a transmit signal from the second radar.

It should be noted that, that the two radars belong to the same category herein means that transmit parameters of the two radars are consistent. Each radar may have a plurality of transmit parameters. For example, one transmit parameter is start moments of signal transmission of a plurality of transmit antennas of the radar, and one transmit parameter is chirp slopes of signal transmission of a plurality of transmit antennas of the radar. For the two radars, provided that values of at least one of the two transmit parameters are different, or a difference between values of at least one of the two transmit parameters is greater than a value, it indicates that the two radars have different categories. For example, start moments of signal transmission of a plurality of transmit antennas of the first radar are different from start moments of signal transmission of a plurality of transmit antennas of the second radar, and this indicates that the first radar and the second radar have different categories. Alternatively, differences between chirp slopes of signal transmission of a plurality of transmit antennas of the first radar and chirp slopes of signal transmission of a plurality of transmit antennas of the second radar are greater than a value, and this indicates that the first radar and the second radar have different categories. Alternatively, start moments of signal transmission of a plurality of transmit antennas of the first radar are different from start moments of signal transmission of a plurality of transmit antennas of the second radar, and chirp slopes of signal transmission of the plurality of transmit antennas of the first radar are different from chirp slopes of signal transmission of the plurality of transmit antennas of the second radar; and this indicates that the first radar detection apparatus and the second radar detection apparatus have different categories. Alternatively, start moments of signal transmission of a plurality of transmit antennas of the first radar are the same as start moments of signal transmission of a plurality of transmit antennas of the second radar, and chirp slopes of signal transmission of the plurality of transmit antennas of the first radar are the same as chirp slopes of signal transmission of the plurality of transmit antennas of the second radar; and this indicates that the first radar and the second radar have a same category.

To reduce or avoid interference between radars, in a process of using the first radar, a value of a transmit parameter of the first radar is adjusted, so that the first radar and the second radar belong to different categories. For example, a value of the first transmit parameter is a first value, and the first radar transmits a signal based on the first transmit parameter. Then, in the process of using the first radar, the first radar may further determine a value of the first transmit parameter to be used, for example, a second value. That is, afterward, the first radar may update the value of the first transmit parameter from the first value to the second value, so that the first radar and another radar have different categories, and mutual interference between the first radar and the another radar is reduced.

For example, if the first radar transmits a signal in a TDM mode, the first transmit parameter may be used to indicate start moments and/or time intervals of signal transmission of a plurality of transmit antennas, and there may be several indication manners:

In a first manner, the first transmit parameter may include a start moment at which each transmit antenna of the plurality of transmit antennas separately transmits a signal, and implicitly indicate time intervals of signal transmission of the plurality of transmit antennas. In this manner, the time intervals of the signal transmission of the plurality of transmit antennas may be the same or may be different.

In a second manner, the first transmit parameter may include a start moment and one time interval of signal transmission of the first transmit antenna. In this manner, it is implicitly indicated that in the plurality of transmit antennas, time intervals of signal transmission of two transmit antennas adjacent in time domain may be fixed, that is, time intervals of signal transmission of two transmit antennas adjacent in time domain are the same.

In a third manner, the first transmit parameter may include a start moment and a plurality of time intervals of signal transmission of the first transmit antenna, and the plurality of time intervals are different. In this manner, time intervals of signal transmission of the plurality of transmit antennas are different.

If the first transmit parameter corresponds to the first manner, the first radar may update, from the first value to the second value, the start moment at which each transmit antenna separately transmits a signal. If the first transmit parameter corresponds to the second manner, the first radar may update, from the first value to the second value, the start moment of signal transmission of the first transmit antenna, and/or update the time interval of the first transmit antenna from the first value to the second value. If the first transmit parameter corresponds to the third manner, the first radar may update, from the first value to the second value, the start moment of signal transmission of the first transmit antenna, and/or separately update the plurality of time intervals from the first value to the second value.

For another example, if the first radar transmits a signal in an FDM mode, the first transmit parameter may be used to indicate frequency domain start locations and/or frequency spacings of signal transmission of a plurality of transmit antennas. The frequency domain start location herein may also be a center frequency location of signal transmission of the transmit antenna. There may be the following several manners in which the first transmit parameter indicates frequency domain start locations and/or frequency spacings of signal transmission of a plurality of transmit antennas:

In a first manner, the first transmit parameter may include a frequency domain start location at which each transmit antenna of the plurality of transmit antennas separately transmits a signal, and implicitly indicate frequency spacings of signal transmission of the plurality of transmit antennas. In this manner, the frequency spacings of signal transmission of the plurality of transmit antennas may be the same or may be different.

In a second manner, the first transmit parameter may include a frequency domain start location and one frequency spacing of signal transmission of the first transmit antenna. In this manner, it is implicitly indicated that in the plurality of transmit antennas, frequency spacings of signal transmission of two transmit antennas adjacent in frequency domain may be fixed, that is, frequency spacings of signal transmission of two transmit antennas adjacent in frequency domain are the same.

In a third manner, the first transmit parameter may include a frequency domain start location and a plurality of frequency spacings of signal transmission of the first transmit antenna, and the plurality of frequency spacings are different. In this manner, frequency spacings of signal transmission of the plurality of transmit antennas are different.

If the first transmit parameter corresponds to the first manner, the first radar may update, from the first value to the second value, a frequency domain start location at which each transmit antenna separately transmits a signal. If the first transmit parameter corresponds to the second manner, the first radar may update, from the first value to the second value, the frequency domain start location of signal transmission of the first transmit antenna, and/or update the frequency spacing of the first transmit antenna from the first value to the second value. If the first transmit parameter corresponds to the third manner, the first radar may update, from the first value to the second value, the frequency domain start location of signal transmission of the first transmit antenna, and/or update the plurality of frequency spacings from the first value to the second value.

Usually, interference to the first radar is caused only when another radar, such as the second radar, is within a maximum detection range of the first radar. Therefore, in the process of using the first radar, the first radar may adaptively update the value of the first transmit parameter. For ease of understanding, the following uses FIG. 14, FIG. 15, and FIG. 16 as examples for description.

Figure 14:
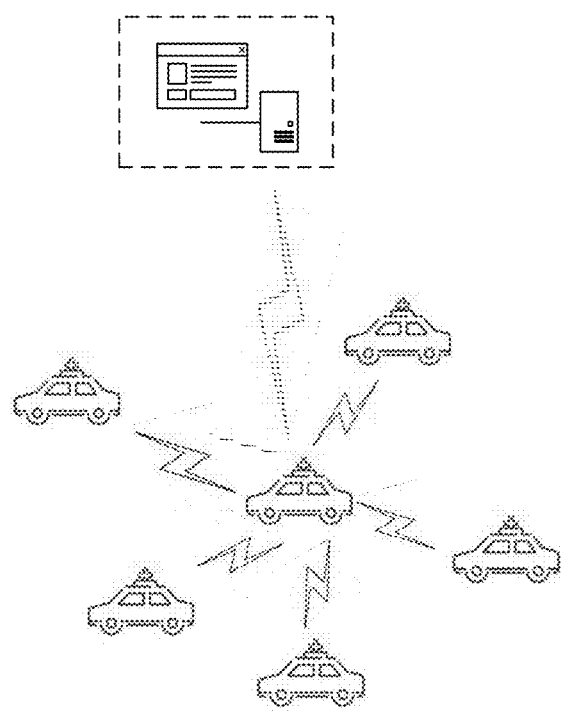
FIG. 14 is a schematic diagram of an application scenario applicable to an embodiment of this application.

FIG. 14 is a schematic diagram of an application scenario. FIG. 14 includes a plurality of radars, for example, including a first radar and a plurality of second radars; and a central node. The first radar is an in-vehicle radar, and the plurality of second radars may be in-vehicle radars, or may be, for example, radars disposed on an RSU. The plurality of second radars exist within a maximum detection distance of the first radar. For example, the plurality of second radars are in-vehicle radars in FIG. 14. The central node is not indispensable in the application scenario in FIG. 14, and therefore is indicated by using a dashed line in FIG. 14.

Figure 15:
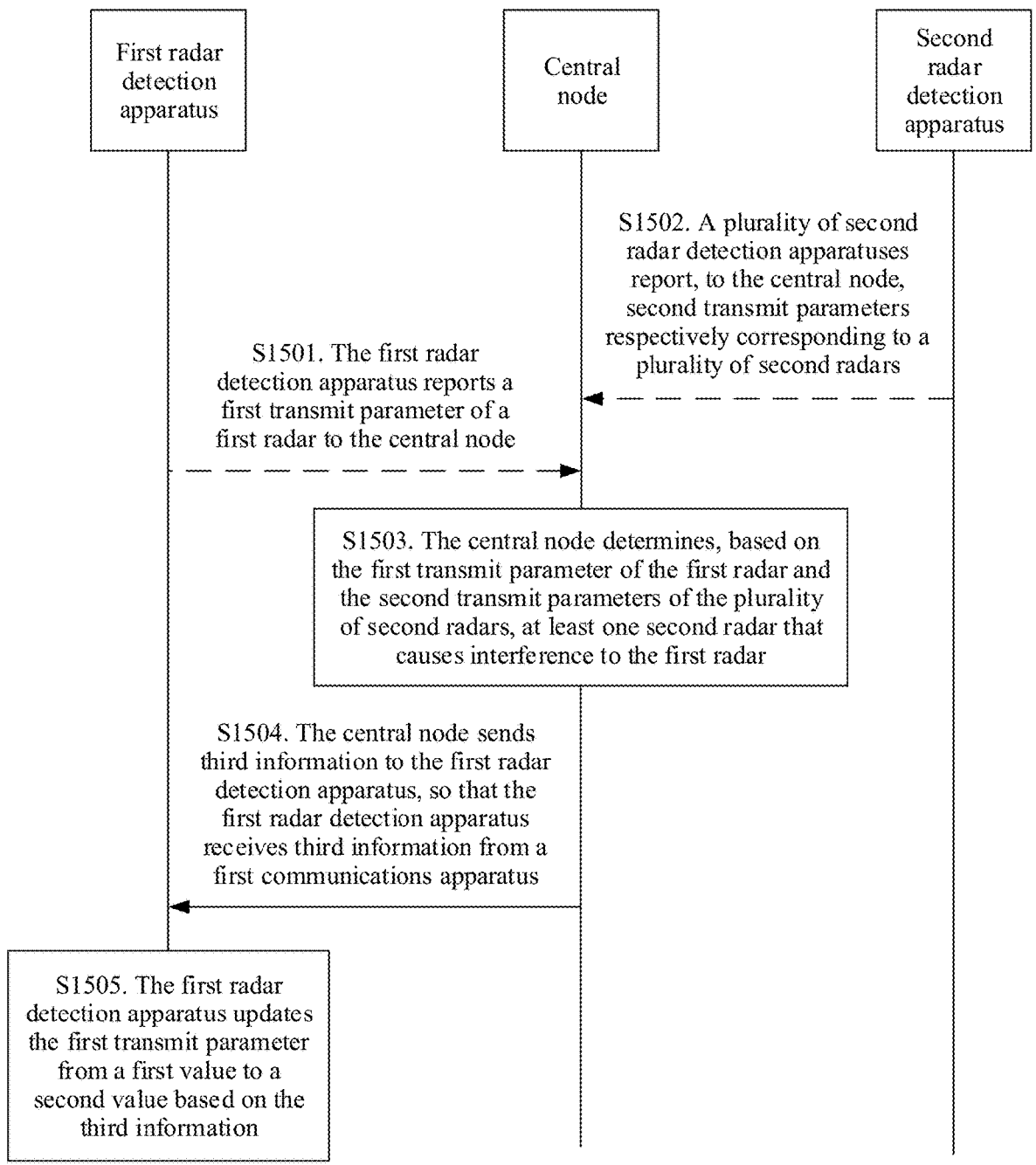
FIG. 15 is a flowchart of a radar signal sending method according to an embodiment of this application.

FIG. 15 is a schematic flowchart of updating a first transmit parameter by a first radar, so as to be applied to the application scenario that includes the central node in FIG. 14. A method provided in the embodiment shown in FIG. 15 may be performed by a radar detection apparatus in the scenario shown in FIG. 14. For example, the radar detection apparatus is referred to as a first radar detection apparatus, a first radar, or a first communications apparatus. That the first radar updates the first transmit parameter specifically includes the following steps:

S1501. The first radar detection apparatus reports the first transmit parameter of the first radar to the central node.

S1502. A plurality of second radar detection apparatuses report, to the central node, second transmit parameters respectively corresponding to a plurality of second radars.

For example, the first radar may send first information to the central node by using a first communications apparatus communicatively connected to the first radar, where the first information includes the first transmit parameter. Each second radar in the plurality of second radars may send second information to the central node by using a second communications apparatus communicatively connected to the second radar, where the second information includes the second transmit parameter. Herein, the first communications apparatus and the second communications apparatus may be radar chips, in-vehicle communications apparatuses, or the like. A sequence between step S1501 and step S1502 is not limited.

S1503. The central node determines, based on the first transmit parameter of the first radar and the second transmit parameters of the plurality of second radars, at least one second radar that causes interference to the first radar.

The central node may compare the first transmit parameter of the first radar with the second transmit parameters of the plurality of second radars. If a second transmit parameter of a second radar is the same as or similar to the first transmit parameter, it may be determined that the second radar in the plurality of second radars and the first radar have a same category. If the second radar is located within the maximum ranging distance of the first radar, it is determined that the second radar causes interference to the first radar.

S1504. The central node sends third information to the first radar detection apparatus, so that the first radar detection apparatus receives the third information from the first communications apparatus.

S1505. The first radar detection apparatus updates the first transmit parameter from a first value to a second value based on the third information.

The central node determines that there is a second radar that causes interference to the first radar, and the central node may instruct the first radar to update a value of the first transmit parameter of the first radar, so as to avoid interference caused by the second radar to the first radar. In a possible embodiment, the central node may send the third information to the first radar detection apparatus, so as to instruct to update the value of the first transmit parameter of the first radar. For example, the central node instructs, in the following several cases, the first radar to update the value of the first transmit parameter:

In a first case, the third information may be a second value obtained by the central node based on a value of a second transmit parameter of at least one second radar and the first value of the first transmit parameter of the first radar. In this case, the third information may carry the second value. The first radar detection apparatus may directly update the first transmit parameter of the first radar from the first value to the second value based on the third information, without re-determining the second value, thereby reducing a calculation amount of the first radar detection apparatus, and reducing a burden on the first radar detection apparatus.

In a second case, the third information may alternatively be information instructing the first radar detection apparatus to update the first value, but does not carry the second value. In this case, the first radar may re-determine the value of the first transmit parameter.

For example, the first radar may send request information to second communications apparatuses of a plurality of second radars around the first communications apparatus, where the request information is used to request a second transmit parameter of the second radar. Correspondingly, the first radar may receive second transmit parameters sent by the plurality of second radars. The first radar then determines the second value of the first transmit parameter based on the received second transmit parameters of the plurality of second radars, and updates the first transmit parameter from the first value to the second value.

For another example, the third information may include a second transmit parameter of at least one second radar. In this case, the central node may send the third information to a communications apparatus connected to the first radar, and the communications apparatus further sends the third information to the first radar. When receiving the third information, the first radar may determine, based on the second transmit parameter of the at least one second radar, how to update the first transmit parameter, that is, determine the second value of the first transmit parameter, and further update the first transmit parameter from the first value to the second value.

For another example, the third information may include a second transmit parameter of at least one second radar and the first transmit parameter of the first radar. In this case, the central node may send the third information to the first radar detection apparatus. The first radar detection apparatus determines the second value of the first transmit parameter of the first radar based on the third information, and then sends the second value to the first radar.

In the foregoing process of updating the first transmit parameter by the first radar, an example in which the central node is included in FIG. 14 is used. The following describes a process of updating the first transmit parameter by the first radar by using an example in which the central node is not included in FIG. 14.

Figure 16:
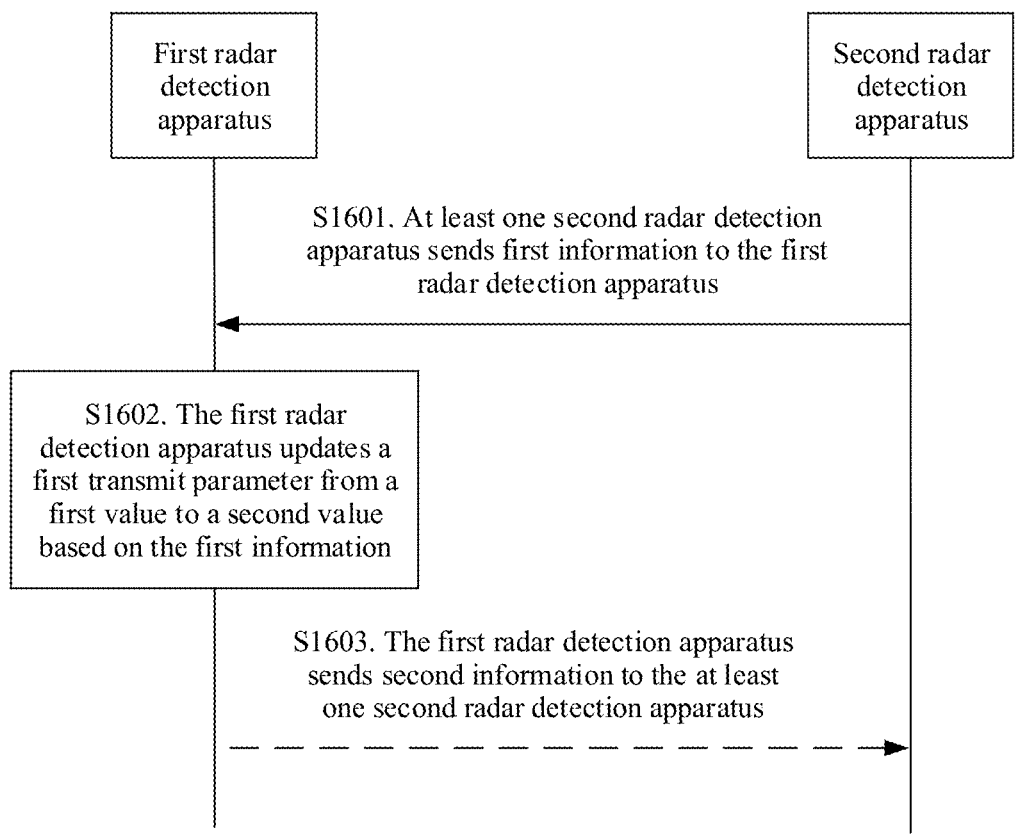
FIG. 16 is a flowchart of a radar signal sending method according to an embodiment of this application.

FIG. 16 is another schematic flowchart of updating a first transmit parameter by a first radar, and the following steps are specifically included.

S1601. At least one second radar detection apparatus sends first information to a first radar detection apparatus, so that the first radar detection apparatus receives the first information from the at least one second radar detection apparatus.

The first information includes a second transmit parameter of at least one second radar.

The foregoing describes how to avoid interference caused by the second radar to the first radar from a perspective of the first radar. From a perspective of the second radar, similarly, the second radar also needs to avoid interference caused by the first radar to the second radar.

In some embodiments, at least one second radar may actively notify the first radar of a second transmit parameter of the at least one second radar. For example, the at least one second radar may broadcast the first information by using at least one second radar detection apparatus (a communications apparatus communicatively connected to the second radar). First information broadcast by each second radar detection apparatus carries a second transmit parameter of a corresponding second radar, so as to notify another radar around each second radar that a transmit parameter of the another radar may be adjusted based on a received second transmit parameter, so as to minimize or avoid mutual interference between radars.

In still some embodiments, the first radar may actively obtain a second transmit parameter of at least one second radar. For example, the first radar may broadcast a request message by using the first radar detection apparatus (a communications apparatus communicatively connected to the first radar), and the request message requests a surrounding second radar to report a second transmit parameter. The surrounding second radar receives the request message and sends the second transmit parameter to the first radar, so that the first radar receives a second transmit parameter from at least one second radar.

The first radar may receive, by using the first radar detection apparatus, first information broadcast by a plurality of second radars by using the second radar detection apparatus, so as to update a value of the first transmit parameter of the first radar based on the first information.

S1602. The first radar detection apparatus updates the first transmit parameter from a first value to a second value based on the first information.

Currently, the value of the first transmit parameter of the first radar is the first value. If values of second transmit parameters of some or all of the at least one second radar received by the first radar are also the first value, to reduce interference caused by the some or all the second radars to the first radar, the first radar may update the first transmit parameter from the first value to the second value, and the updated second value is different from the values of the second transmit parameters respectively corresponding to the some or all the second radars.

If the value of the second transmit parameter of the at least one second radar received by the first radar is not equal to the first value, no interference is caused to the first radar. In this case, the first radar may not update the value of the first transmit parameter.

S1603. The first radar detection apparatus sends second information to the at least one second radar detection apparatus.

Same as the second radar, the first radar may also broadcast second information to a second radar detection apparatus of at least one surrounding second radar by using the first radar detection apparatus, where the second information includes the first transmit parameter, so as to notify the at least one second radar of the transmit parameter used by the first radar. In this way, each second radar may determine, based on the first transmit parameter of the first radar, whether to update the value of the second transmit parameter, so as to reduce or avoid interference caused by the first radar to the second radar.

It should be noted that step S1603 is not related to performing of step S1601 and step S1602, that is, performing of step S1603 does not depend on step S1601 or step S1602. Step S1603 may be performed before step S1601, or may be performed after step S1601. In FIG. 16, step S1603 is indicated by using a dashed line.

In addition, in some other embodiments, the first information may be further used to represent other parameter information of the at least one second radar.

For example, the first information may be further used to indicate location information of the at least one second radar, and the location information may be considered to be used to indicate a coordinate location of the radar. For example, if the at least one second radar is an in-vehicle radar, a coordinate location of the in-vehicle radar may change. For example, if the at least one second radar is fixed, for example, is a radar disposed on an RSU, a corresponding coordinate location does not change.

For another example, the first information may also be used to indicate orientation information of the at least one second radar, and the orientation information may be considered as information used to indicate an observation direction of the radar.

For another example, the first information may also be used to indicate an irradiation angle of the at least one second radar.

Alternatively, the first information may be used to indicate any combination of the location information, the orientation information, and the irradiation angle. This embodiment of this application sets no limitation on radar parameter information included in the first information.

If the first information received by the first radar includes other parameter information in addition to the second transmit parameter, such as the location information of the at least one second radar, the first radar may determine, based on another parameter of the second radar, whether to update the value of the transmit parameter. For example, if the location information of the at least one second radar indicates that the at least one second radar is relatively far from the first radar, and does not cause interference to the first radar, the first radar determines not to update the value of the transmit parameter, so as to minimize energy consumption of the first radar.

In this embodiment of this application, the first radar may have different update methods for updating the first transmit parameter from the first value to the second value. In a possible update manner, the first radar may randomly determine the second value, and then update the first transmit parameter from the first value to the second value. In another possible update manner, the first radar may update the first transmit parameter from the first value to the second value based on a preset adjustment granularity.

In the following description process, an example in which the first radar updates the first transmit parameter from the first value to the second value based on the preset adjustment granularity is used. The preset adjustment granularity may include at least one of one PRT, one probe frame, a plurality of consecutive probe frames, and an antenna rotation period. The probe frame refers to a plurality of consecutive PRTs used by a radar to make measurement once.

The antenna rotation period refers to a time length unit of transmitting a signal by a radar. One rotation period refers to a resource length occupied by a plurality of transmit antennas of a radar to continuously transmit signals. When a radar transmits a signal, a next rotation period is entered immediately after a rotation period ends.

For example, a radar transmits a signal in an FDM mode, and transmit antenna are numbered according to a spatial sequence of the transmit antennas. For example, referring to FIG. 6, a plurality of transmit antennas are a transmit antenna Tx1, a transmit antenna Tx2, and a transmit antenna Tx3. Starting from a first moment t of 0, the transmit antenna Tx1, the transmit antenna Tx2, and the transmit antenna Tx3 simultaneously transmit a signal by using different center frequencies. Then, starting from a second moment t1, the transmit antenna Tx1, the transmit antenna Tx2, and the transmit antenna Tx3 further simultaneously transmit a signal by using different center frequencies. By analogy, starting from a third moment t2, the transmit antenna Tx1, and the transmit antenna Tx2, and the transmit antenna Tx3 further simultaneously transmit a signal by using different center frequencies. Correspondingly, one rotation period is an interval, such as T shown in FIG. 6, between start moments of two adjacent signals transmitted by, for example, the transmit antenna Tx1, the transmit antenna Tx2, or the transmit antenna Tx3.

Similarly, a radar transmits a signal in a TDM mode, and transmit antennas are numbered according to a spatial sequence of the transmit antennas. For example, referring to (a) of FIG. 17, a transmit antenna Tx1, a transmit antenna Tx2, and a transmit antenna Tx3 cyclically transmit signals. That is, for example, in the first cycle, the transmit antenna Tx1, the transmit antenna Tx2, and the transmit antenna Tx3 sequentially transmit signals in a time sequence starting from a first moment t1. Then, in the second cycle, the transmit antenna Tx1, the transmit antenna Tx2, and the transmit antenna Tx3 sequentially transmit signals in the same time sequence starting from a second moment t2. A time difference between start moments of two adjacent cycles is T1 shown in (a) of FIG. 17, that is, a length of one antenna rotation period.

Figure 17:
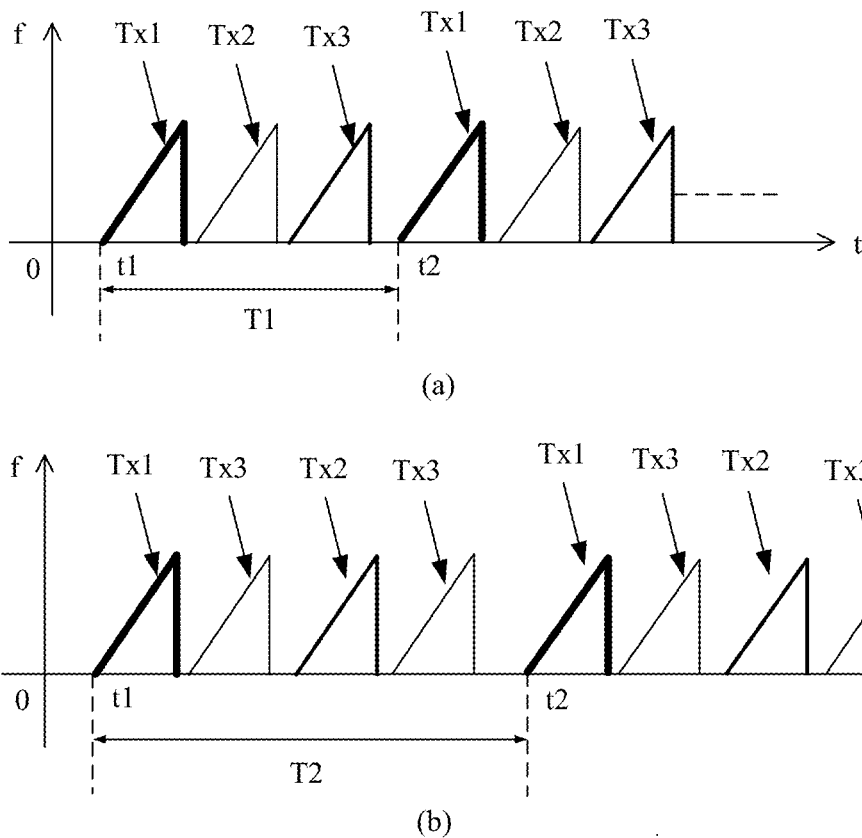
FIG. 17 is a schematic diagram in which an FMCW MIMO radar transmits a signal in an FDM mode according to an embodiment of this application.

For another example, referring to (b) of FIG. 17, a transmit antenna Tx1, a transmit antenna Tx3, a transmit antenna Tx2, and the transmit antenna Tx3 cyclically transmit signals. That is, for example, in the first cycle, the transmit antenna Tx1, the transmit antenna Tx3, the transmit antenna Tx2, and the transmit antenna Tx3 sequentially transmit signals in a time sequence starting from a first start moment t1. Then, in the second cycle, the transmit antenna Tx1, the transmit antenna Tx3, the transmit antenna Tx2, and the transmit antenna Tx3 sequentially transmit signals in the same time sequence starting from a second start moment t2. In this case, one rotation period is a time difference between start moments of two adjacent cycles, such as T2 shown in (b) of FIG. 17, that is, a length of one antenna rotation period.

In a plurality of consecutive probe frames, a length of each probe frame may be the same; or lengths of some probe frames in the plurality of probe frames are the same, and lengths of some probe frames are different. This embodiment of this application sets no limitation on lengths of the plurality of probe frames. When updating the value of the first transmit parameter, the first radar may select an adjustment granularity.

For example, the first transmit parameter includes time intervals or frequency spacings of signal transmission of a plurality of transmit antennas included in the first radar. The first radar may select one probe frame as an adjustment granularity, and adjust the first transmit parameter from the first value to the second value. Alternatively, the first radar may select a plurality of consecutive probe frames as an adjustment granularity, and adjust the first transmit parameter from the first value to the second value. For another example, if the first radar transmits a signal in a TDM mode, and the first transmit parameter includes the time intervals of signal transmission of the plurality of transmit antennas included in the first radar, the first radar may select one PRT to adjust the first transmit parameter from the first value to the second value. For another example, if the first radar transmits a signal in an FDM mode, and the first transmit parameter includes the frequency spacings of signal transmission of the plurality of transmit antennas included in the first radar, the first radar may select an antenna rotation period as an adjustment granularity, and update the first transmit parameter from the first value to the second value.

That the first transmit parameter includes time intervals or frequency spacings of signal transmission of a plurality of transmit antennas is merely an example. The first transmit parameter may also be an initial phase or a chirp slope of each transmit pulse.

In this embodiment of this application, in the process of using the first radar, updating the value of the first transmit parameter may reduce a probability that a characteristic of a signal transmitted by the first radar is consistent with a characteristic of a signal transmitted by another radar, thereby reducing or avoiding mutual interference between the first radar and the another radar.

The foregoing embodiments describe how to reduce or avoid mutual interference between a plurality of radars. However, in a possible case, mutual interference may still exist between a plurality of radars. As shown in FIG. 8, when a radar detects a target, a detected target includes a pseudo target, that is, a target that actually does not exist.

In view of this, an embodiment of this application further provides a target detection method. The method may be performed by a radar detection apparatus. The radar detection apparatus may be a radar chip, or may be a communications apparatus that communicates with a radar, for example, an in-vehicle communications apparatus. For ease of description, in most cases in the following embodiments of this application, that a detection apparatus is a radar detection apparatus, and the radar detection apparatus is a radar such as a millimeter-wave radar is used as an example for description and explanation of the embodiments. However, it is not limited in the embodiments of this application that the detection apparatus is only a radar detection apparatus, and the radar detection apparatus is only a millimeter-wave radar or a radar. In addition, a signal sent by the detection apparatus may be a radio signal. For example, if the detection apparatus is a radar detection apparatus, it may be considered that a signal sent by the detection apparatus is a radar signal. In the embodiments of this application, for example, the detection apparatus is a radar detection apparatus, and a signal sent by the detection apparatus is a radar signal.

Figure 18:
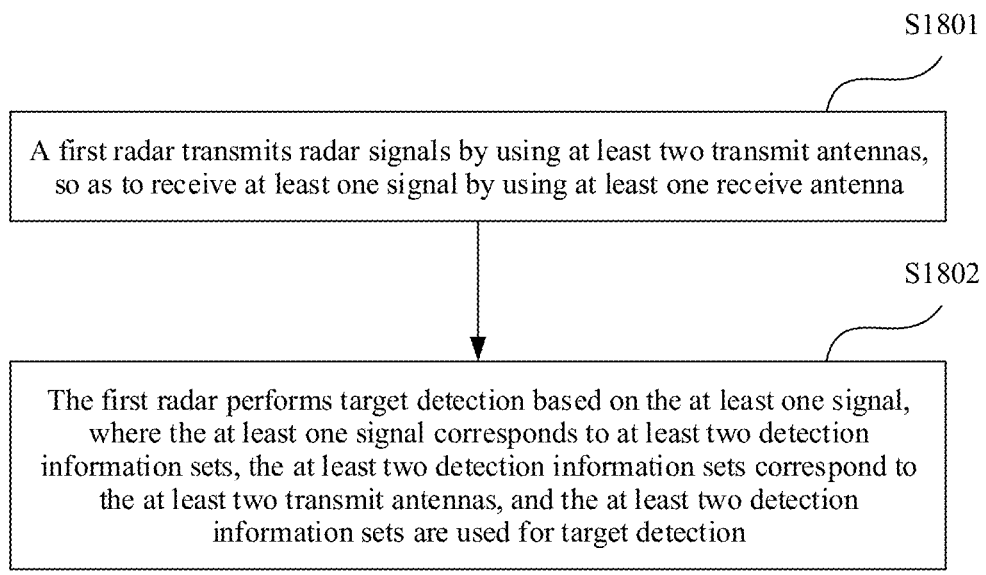
FIG. 18 is a flowchart of a detection method according to an embodiment of this application.

FIG. 18 is a flowchart of a detection method according to an embodiment of this application. In the following description process, for example, the method is applied to a first radar detection apparatus, and the first radar detection apparatus is a first radar. The first radar includes at least two transmit antennas and at least one receive antenna. A specific process of the method is as follows.

S1801. The first radar transmits radar signals by using the at least two transmit antennas, so as to receive at least one signal by using the at least one receive antenna.

When needing to detect a surrounding target object, the first radar may transmit radar signals by using the included transmit antennas. If a plurality of target objects exist around the first radar, and the plurality of target objects are within a maximum ranging distance of the first radar, the radar signals transmitted by the first radar are reflected by the plurality of target objects to the first radar, so that the first radar receives at least one signal from the target object.

It should be noted that if the plurality of target objects are too small to reflect the radar signal, the at least one signal does not include a signal obtained after the plurality of target objects reflect the received radar signal. Alternatively, in a possible case, the plurality of target objects include a second radar, and the second radar is too small to reflect the radar signal transmitted by the first radar. However, the second radar may transmit a radar signal by using a transmit antenna, and the at least one signal may include the radar signal from the second radar. Alternatively, the at least one signal may include the radar signal transmitted by the second radar, in addition to the signal obtained after the plurality of target objects reflect the received radar signal. For example, in a possible case, the second radar exists in the plurality of target objects. In a time period in which the first radar receives a reflected signal, the second radar may transmit a radar signal by using a transmit antenna, and the at least one signal further includes the radar signal from the second radar. Alternatively, the at least one signal may further include a signal obtained by scattering or reflecting another signal by the ground or the like. The at least one signal may be considered in the detection method provided in this embodiment of this application in specific implementation, and implementation and beneficial effects of this embodiment of this application are not affected.

S1802. The first radar performs target detection based on the at least one signal, where the at least one signal corresponds to at least two detection information sets, the at least two detection information sets correspond to the at least two transmit antennas, and the at least two detection information sets are used for target detection.

The first radar receives the at least one signal, and may process the at least one signal, so as to detect a target around the first radar.

In this embodiment of this application, the first radar includes at least two transmit antennas, and radar signals transmitted by different transmit antennas have different characteristics. For example, center frequencies of radar signals transmitted by different transmit antennas are different, or start time of radar signals transmitted by different transmit antennas is different, or chirp slopes of radar signals transmitted by different transmit antennas are different. Therefore, the first radar may extract signals corresponding to different transmit antennas from the at least one received signal based on different radar signals transmitted by the different transmit antennas. That the first radar extracts signals corresponding to different transmit antennas from the at least one received signal may also be understood as follows: In this embodiment of this application, a MIMO radar is considered as a plurality of SIMO radars, and each transmit antenna and all receive antennas correspond to one group of signals.

For ease of description, in the following description, for example, the first radar includes two transmit antennas. The two transmit antennas are respectively a first transmit antenna and a second transmit antenna. A signal that corresponds to the first transmit antenna and that is extracted by the first radar from the at least one signal is a first signal, and a signal that corresponds to the second transmit antenna and that is extracted by the first radar from the at least one signal is a second signal.

After extracting the first signal and the second signal, the first radar separately processes the first signal and the second signal to obtain two detection information sets used for target detection, for example, a first detection information set and a second detection information set. The first signal corresponds to the first detection information set, and the second signal corresponds to the second detection information set. It should be noted that if the first radar includes at least three transmit antennas, the first radar may determine at least three detection information sets based on the at least one signal, where the transmit antennas are in a one-to-one correspondence with the detection information sets. For example, the first radar includes a transmit antenna 1, a transmit antenna 2, and a transmit antenna 3, and the determined detection information sets include a detection information set 1 corresponding to the transmit antenna 1, a detection information set 2 corresponding to the transmit antenna 2, and a detection information set 3 corresponding to the transmit antenna 3.

Detection information included in the detection information set may be understood as information used to determine a characteristic of a target. For example, the detection information may represent information such as a distance or a speed of the target relative to the first radar, or a radar cross-section (RCS). For example, the detection information may be a distance or a speed of the target relative to the first radar, an RCS, or the like. Alternatively, the detection information may be a grid point or sampling point sequence number in two-dimensional data formed after signal sampling and quantization, and the grid point or sampling point sequence number may represent the distance of the target relative to the first radar. There are a plurality of representation forms of the detection information, and are not described one by one herein. Certainly, if the first radar includes at least two receive antennas, the detection information set may further include information that represents an angle of the target relative to the first radar.

Specifically, in a possible solution, for a method for processing the first signal or the second signal by the first radar to obtain the corresponding detection information set, refer to the foregoing method for determining, by the radar, the relative distance and speed between the target object and the radar system based on the intermediate frequency signal. That is, the first signal and the local-frequency signal are mixed to obtain the intermediate frequency signal, which is then transformed to the range-Doppler domain to obtain a plurality of pieces of detection information to form a detection information set. If the first radar includes at least two receive antennas, the first radar may transform the intermediate frequency signal to a range-Doppler-angle domain to obtain detection information used to represent an angle of the target relative to the first radar, and details are not described herein.

Alternatively, in another possible solution, after obtaining a range-Doppler domain representation of a signal corresponding to each transmit antenna, the first radar performs point-by-point modulo operations on amplitudes of range-Doppler domain representations of the first signal and the second signal, or performs point-by-point modulo operations on power of range-Doppler domain representations of the first signal and the second signal and calculates a square; and then calculates a result of superposition of all the receive antennas to obtain detection information. That is, a union set is obtained from calculation results of all the receive antennas, thereby reducing a loss probability of a target.

The detecting, by the first radar, the target object based on the at least one signal may be detecting the target object based on the at least two detection information sets corresponding to the at least one signal, so as to determine a valid target. It should be noted that the valid target is a target object that is detected by the first radar within the maximum ranging distance of the first radar and that actually exists, for example, a fixed roadblock or a moving vehicle. In some practical scenarios, a signal transmitted by a second radar (for example, the second radar is mounted or carried on a vehicle) is received by the first radar, and the transmit signal of the second radar causes interference to the first radar. For example, the first radar considers a radar signal transmitted by the second radar as a reflected signal from another target object for a radar signal transmitted by the first radar. In this case, the first radar may detect one or more targets by performing target detection based on the transmitted radar signal and the received radar signal transmitted by the second radar. Actually, the one or more targets do not exist. In the following, a target that actually does not exist is referred to as a pseudo target. The valid target is a target other than the pseudo target.

For example, there may be the following several cases in which the valid target is determined based on the at least two detection information sets.

In a first case, if at least one empty set exists in the at least two detection information sets, that is, at least one detection information set does not include any detection information, it may be considered that there is no valid target within the maximum ranging distance of the first radar.

For example, in a possible scenario, the first radar is located in an open area, and no detection target exists in the open area. In this case, there is at least one detection information set that does not include detection information, that is, an empty set.

In some embodiments, after a signal corresponding to each transmit antenna is extracted from the at least one signal in this embodiment of this application, a detection information set may be simultaneously determined for each transmit antenna, or a detection information set corresponding to each transmit antenna may be successively determined. If the detection information set corresponding to each transmit antenna is successively determined in this embodiment of this application, when it is determined for the first time that a detection information set is an empty set, it is considered that no valid target exists, and another detection information set is no longer determined, so as to minimize energy consumption.

In a second case, for a same valid target, a propagation path of a signal transmitted by each SIMO radar is almost the same. In this case, a signal received by the SIMO radar also has a same characteristic such as an amplitude, a delay, a Doppler, and an angle of arrival. That is, for a same characteristic of a same valid target, detection information used to represent the characteristic is the same or similar in different detection information sets, that is, the detection information of the valid target is included in each detection information set in the at least two detection information sets. In this embodiment of this application, a target information set may be determined based on the at least two detection information sets, so as to determine the valid target.

For example, in this embodiment of this application, an intersection set of the at least two detection information sets may be obtained to form a target information set, so as to determine a valid target and exclude a pseudo target based on the target information set. There may be the following several results of obtaining the intersection set of the at least two detection information sets:

In a first result, the intersection set of the at least two detection information sets is an empty set, that is, detection information used to represent a same characteristic is different in the at least two detection information sets, and it may be determined that there is no valid target.

For example, in a possible scenario, the first radar is located in a region, a second radar exists in the region, and a transmit parameter of signal transmission of the second radar is different from a transmit parameter of signal transmission of the first radar. Therefore, there is no valid target except the second radar. In this case, the second radar causes interference to the first radar, that is, the first radar misidentifies a radar signal transmitted by the second radar as a transmit signal of a detection target. In this case, detection information used to represent a same characteristic of the second radar is different in the at least two detection information sets, that is, the second radar is determined as a pseudo target.

In a second result, the intersection set of the at least two detection information sets is not an empty set, that is, detection information used to represent a same characteristic is consistent in the at least two detection information sets, to form a target information set. The target information set may indicate at least one valid target.

For example, in a possible scenario, the first radar is located in a region, there is a detection target such as a roadblock in the region, or there may be a second radar, and a transmit parameter of signal transmission of the second radar is different from a transmit parameter of signal transmission of the first radar. In this case, detection information used to represent a same characteristic of the second radar is different in the at least two detection information sets. However, detection information representing a same characteristic of the roadblock is consistent in the at least two detection information sets and belongs to target information.

It should be noted that, that the detection information used to represent the same characteristic is consistent in the at least two detection information sets means that values of the detection information representing the same characteristic are the same in the at least two detection information sets, or values of the detection information representing the same characteristic are similar in the at least two detection information sets.

When the target information set is determined, in this embodiment of this application, corresponding detection information used to represent a characteristic parameter, for example, a first characteristic parameter, of a detection target in a specific detection information set in the at least two detection information sets, may be compared with detection information corresponding to a first characteristic parameter in a detection information set other than the specific detection information set in the at least two detection information sets, so as to determine the target information set.

In some embodiments, if it is determined that values of the detection information corresponding to the first characteristic parameters in the at least two detection information sets are the same, in may be determined that the detection information is target information in this embodiment of this application. The first characteristic parameter may be, for example, a relative speed between the detection target and the radar, a relative distance between the detection target and the radar, or a relative angle between the detection target and the radar. In this embodiment of this application, a characteristic parameter, for example, the relative speed between the detection target and the radar, may be determined based on the detection information. Alternatively, a characteristic parameter, for example, the relative angle between the detection target and the radar, may be determined based on the received at least one signal and two detection information sets.

Alternatively, in some other embodiments, in consideration of radar precision, different transmit antennas transmit radar signals at specific transmit timings. Because of a possible difference in an actual communication scenario, environment, or hardware device, there is an error in signal transmission of different transmit antennas. In another possible case, in a manufacturing process, different radars may cause some errors in signal transmission due to differences in manufacturing. In another case, there may also be an error due to another reason. In this embodiment of this application, these errors are considered, which may cause an error in detection information used to represent a same characteristic. Therefore, if a target is determined based on detection information for a detection information set, whether a target determined by traversing another detection information set includes at least one piece of detection information within an error range is determined, so as to determine whether the target is a valid target or a pseudo target.

Therefore, in this embodiment of this application, it is assumed that there is a valid target, for example, a first valid target. If it is determined that a difference between values of detection information corresponding to a first characteristic parameter of the first valid target in the at least two detection information sets is less than a first preset threshold, that is, the values of the detection information corresponding to the first characteristic parameter are similar, it may be determined that the detection information is target information in this embodiment of this application. The first preset threshold may be a preset possible value.

It should be noted that, that the difference between the values of the detection information corresponding to the first characteristic parameter in the at least two detection information sets is less than the first preset threshold may be considered that a difference between a value of detection information corresponding to the first characteristic parameter in a detection information set and a value of detection information corresponding to the first characteristic parameter in another detection information set is less than the first preset threshold, or may be considered that when at least three detection information sets exist, a difference between values of detection information corresponding to the first characteristic parameter in any two detection information sets is less than the first preset threshold.

In addition, the detection target has a plurality of characteristic parameters, for example, a relative speed between the detection target and the radar, and a relative distance between the detection target and the radar. The target information may be detection information corresponding to each characteristic parameter that meets a specific condition. For example, a detection parameter of the first valid target may further include a second characteristic parameter. In this case, if values of detection information corresponding to the second characteristic parameter are the same in the at least two detection information sets, it may be determined that the detection information corresponding to the second characteristic parameter is target information in this embodiment of this application. Alternatively, if a difference between the values of the detection information corresponding to the second characteristic parameter in the at least two detection information sets is less than a second preset threshold, it may be determined that the detection information corresponding to the second characteristic parameter is target information in this embodiment of this application. The first preset threshold and the second preset threshold may be a same value or may be different values.

It should be noted that, in this embodiment of this application, detection information separately corresponding to a plurality of characteristic parameters in the at least two detection information sets may be determined as target information, or target information may be determined based on detection information separately corresponding to a plurality of characteristic parameters. For example, a first detection information set and a second detection information set exist, and a first characteristic parameter is a relative speed between a valid target and a radar. A value of detection information corresponding to the first characteristic parameter in the first detection information set is 3.5 kilometers per second (3.5 km/s), and a value of detection information corresponding to the first characteristic parameter in the second detection information set is 3.6 km/s. In this embodiment of this application, it may be determined that target information is 3.55 km/s.

Further, detection information corresponding to a characteristic parameter may be signal strength of a reflected signal from a detection target for a radar signal transmitted by the first radar. After the target information set is determined in this embodiment of this application, a variance of a signal of a target in different target information sets may be further determined. If the variance of the signal is less than or equal to a third preset threshold, the target may be considered as a valid target. On the contrary, if the variance of the signal is greater than the third preset threshold, the target may be considered as a pseudo target.

Therefore, if a plurality of radar detection apparatuses exist, and transmit parameters of radar signals transmitted by the plurality of radar detection apparatuses are different, for a radar detection apparatus, a MIMO radar may be considered as at least two SIMO radars in this embodiment of this application, so that received at least one signal is divided into signals corresponding to the SIMO radars, and the signals corresponding to the SIMO radars are processed to eliminate interference, that is, interference caused by another radar detection apparatus to a radar detection apparatus is eliminated.

The foregoing mainly describes the solutions provided in the embodiments of this application from a perspective of the first radar detection apparatus, or from a perspective of interaction between the first radar detection apparatus and the second radar detection apparatus. With reference to the accompanying drawings, the following describes apparatuses used to implement the foregoing methods in the embodiments of this application. Therefore, the foregoing content may be used in the subsequent embodiments, and repeated content is not described again.

It may be understood that to achieve the foregoing functions, each apparatus, such as the first radar detection apparatus, includes corresponding hardware structures and/or software modules for implementing each function. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, function modules of the first radar detection apparatus may be divided. For example, each function module corresponding to each function may be divided, or two or more functions may be integrated into one processing module. The integrated module may be implemented in a form of hardware, or may be implemented in a form of a software function module. It should be noted that, in this embodiment of this application, module division is exemplary, and is merely a logical function division. In actual implementation, another division manner may be used.

Figure 19:
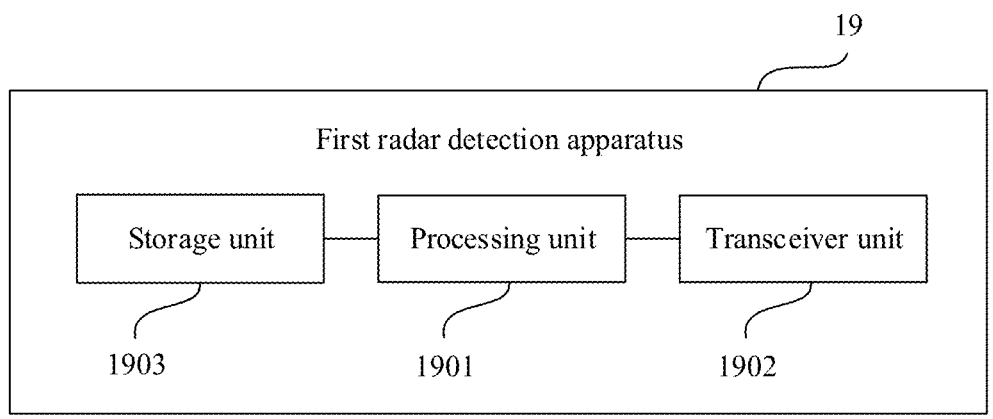
FIG. 19 is a schematic structural diagram of a first radar detection apparatus according to an embodiment of this application.

For example, when function modules of a radar detection apparatus are divided in an integrated manner, FIG. 19 shows a possible schematic structural diagram of the first radar detection apparatus in the foregoing embodiments of this application. The first radar detection apparatus 19 may include a processing unit 1901, a transceiver unit 1902, and a storage unit 1903.

In a first design, the processing unit 1901 may be configured to perform all operations, except a transceiving operation, performed by the first radar detection apparatus in the embodiment shown in FIG. 9, such as S901, and/or is configured to support another process of the technology described in this specification. The transceiver unit 1902 may be configured to perform all transceiving operations performed by the first radar detection apparatus in the embodiment shown in FIG. 9, such as S902, and/or is configured to support another process of the technology described in this specification. The first radar detection apparatus includes at least three transmit antennas, and the at least three transmit antennas include a first transmit antenna, a second transmit antenna, and a third transmit antenna.

The processing unit 1901 is configured to determine a first transmit parameter of a first radar.

The transceiver unit 1902 is configured to send signals based on the first transmit parameter by using the at least three transmit antennas.

The at least three transmit antennas send signals by using TDM, and the first transmit parameter is used to indicate start moments of signal transmission of the at least three transmit antennas. A start moment of signal transmission of the first transmit antenna and a start moment of signal transmission of the second transmit antenna are adjacent in time domain, the start moment of the signal transmission of the second transmit antenna and a start moment of signal transmission of the third transmit antenna are adjacent in time domain, and a time interval between the start moments of the signal transmission of the first transmit antenna and the second transmit antenna is different from a time interval between the start moments of the signal transmission of the second transmit antenna and the third transmit antenna.

Alternatively, the at least three transmit antennas send signals by using FDM, and the first transmit parameter is used to indicate center frequencies of signal transmission of the at least three transmit antennas. A center frequency of signal transmission of the first transmit antenna and a center frequency of signal transmission of the second transmit antenna are adjacent in frequency, the center frequency of the signal transmission of the second transmit antenna and a center frequency of signal transmission of the third transmit antenna are adjacent in frequency, and a frequency spacing between the center frequencies of the signal transmission of the first transmit antenna and the second transmit antenna is different from a frequency spacing between the center frequencies of the signal transmission of the second transmit antenna and the third transmit antenna.

Alternatively, in another design, the processing unit 1901 may be configured to perform all operations, except a transceiving operation, performed by the first radar detection apparatus in the embodiment shown in FIG. 13 and FIG. 15 or FIG. 16, such as S1301, S1505, and S1602, and/or is configured to support another process of the technology described in this specification. The transceiver unit 1902 may be configured to perform all transceiving operations performed by the first radar detection apparatus in the embodiment shown in FIG. 13, FIG. 15, or FIG. 16, such as S1302, S1501, and S1603, and/or is configured to support another process of the technology described in this specification.

The processing unit 1901 is configured to determine a first transmit parameter of a first radar.

The transceiver unit 1902 is configured to transmit a signal based on the first transmit parameter, where
  the first radar includes a plurality of transmit antennas, and the first transmit parameter is used to indicate time intervals and/or sending start moments of signal transmission of the plurality of transmit antennas, or the first transmit parameter is used to indicate frequency spacings and/or frequency domain start locations of signal sending of the plurality of transmit antennas.

In an optional design, the processing unit 1901 is specifically configured to:
  update the first transmit parameter of the first radar from a first value to a second value.

In an optional design, the processing unit 1901 is further configured to:
  obtain first information from a first communications apparatus, where
  the first information is used to indicate the first transmit parameter, and/or the first information is used to indicate a second transmit parameter of at least one second radar, and the first transmit parameter is determined based on the second transmit parameter.

In an optional design, the transceiver unit 1902 is further configured to:
  send second information to the first communications apparatus, where the second information includes the first transmit parameter.

In an optional design, the first information is further used to indicate at least one of the following information:
  location information of the at least one second radar;
  orientation information of the at least one second radar; and
  an irradiation angle of the at least one second radar.

In an optional design, the processing unit 1901 is specifically configured to:

update the first transmit parameter from the first value to the second value based on a preset adjustment granularity, where the preset adjustment granularity includes one pulse repetition time PRT, one probe frame, a plurality of consecutive probe frames, or an antenna rotation period.

In another design, an optional design may be implemented independently, or may be integrated with any one of the foregoing optional designs.

Alternatively, in still another design, the processing unit 1901 may be configured to perform all operations, except a transceiving operation, performed by the first radar detection apparatus in the embodiment shown in FIG. 18, such as S1802, and/or is configured to support another process of the technology described in this specification. The transceiver unit 1902 may be configured to perform all transceiving operations performed by the first radar detection apparatus in the embodiment shown in FIG. 18, such as S1801, and/or is configured to support another process of the technology described in this specification. The radar detection apparatus includes at least two transmit antennas and at least one receive antenna.

The transceiver unit 1902 is configured to receive at least one signal by using the at least one receive antenna.

The processing unit 1901 is configured to perform target detection based on the at least one signal.

The at least one signal corresponds to at least two detection information sets, the at least two detection information sets correspond to the at least two transmit antennas, and the at least two detection information sets are used for target detection.

In an optional design, the processing unit 1901 is specifically configured to:
if at least one empty set exists in the at least two detection information sets, determine that no valid target is detected.

In an optional design, the processing unit 1901 is specifically configured to:
determine a target information set based on the at least two detection information sets;
if the target information set is an empty set, determine that no valid target is detected; and/or
if the target information set is a non-empty set, determine that the target information set indicates at least one valid target, where detection information of the at least one valid target is included in each detection information set of the at least two detection information sets.

In an optional design, the at least one valid target includes a first valid target, and the processing unit 1901 is further configured to:
determine a first characteristic parameter of the first valid target, where
values of detection information corresponding to the first characteristic parameter of the first valid target in the at least two detection information sets are the same; or
a difference between values of detection information corresponding to the first characteristic parameter of the first valid target in the at least two detection information sets is less than a first preset threshold.

In an optional design, the processing unit 1901 is specifically configured to:
determine the first characteristic parameter based on the at least one signal and the at least two detection information sets.

In an optional design, a detection parameter of the first detection target further includes a second characteristic parameter, and the processing unit 1901 is further configured to:
determine the second characteristic parameter of the first detection target, where values of detection information corresponding to the second characteristic parameter of the first valid target are the same in the at least two detection information sets; or
a difference between values of detection information corresponding to the second characteristic parameter of the first valid target in the at least two detection information sets is less than a second preset threshold.

In an optional design, the at least one receive antenna includes at least two receive antennas, the at least one signal includes a plurality of signals, and the processing unit 1901 is further configured to:
transform the plurality of signals into a range-Doppler-angle domain to determine detection information.

In still another design, an optional design may be implemented independently, or may be integrated with any one of the foregoing optional designs.

Figure 20:
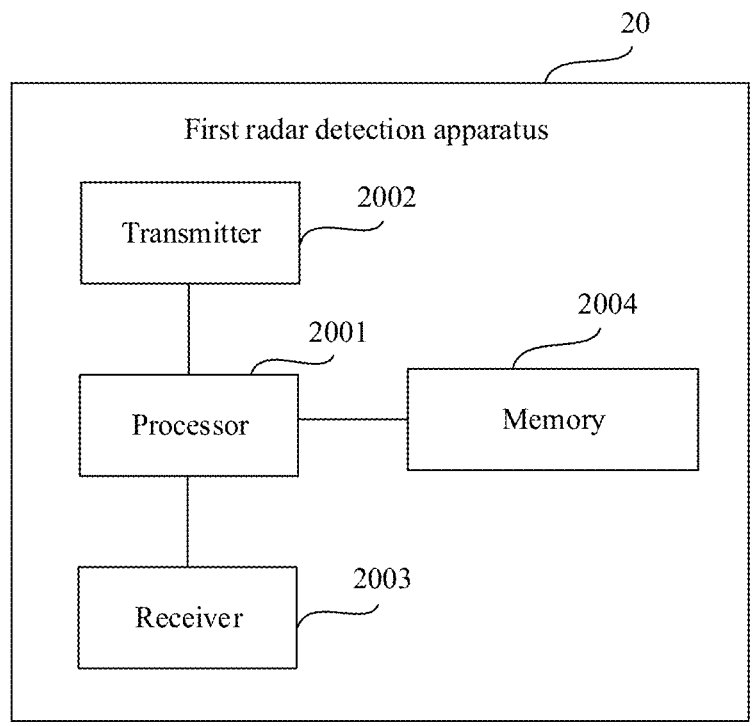
FIG. 20 is another schematic structural diagram of a first radar detection apparatus according to an embodiment of this application.

FIG. 20 is another possible schematic structural diagram of a first radar detection apparatus according to an embodiment of this application. The first radar detection apparatus 20 may include a processor 2001, a transmitter 2002, and a receiver 2003. Functions of the first radar detection apparatus 20 may be separately corresponding to specific functions of the processing unit 1901 and the transceiver unit 1902 shown in FIG. 19. Details are not described herein again. Optionally, the first radar detection apparatus 20 may further include a memory 2004, configured to store a program instruction and/or data for reading by the processor 2001.

Figure 21:
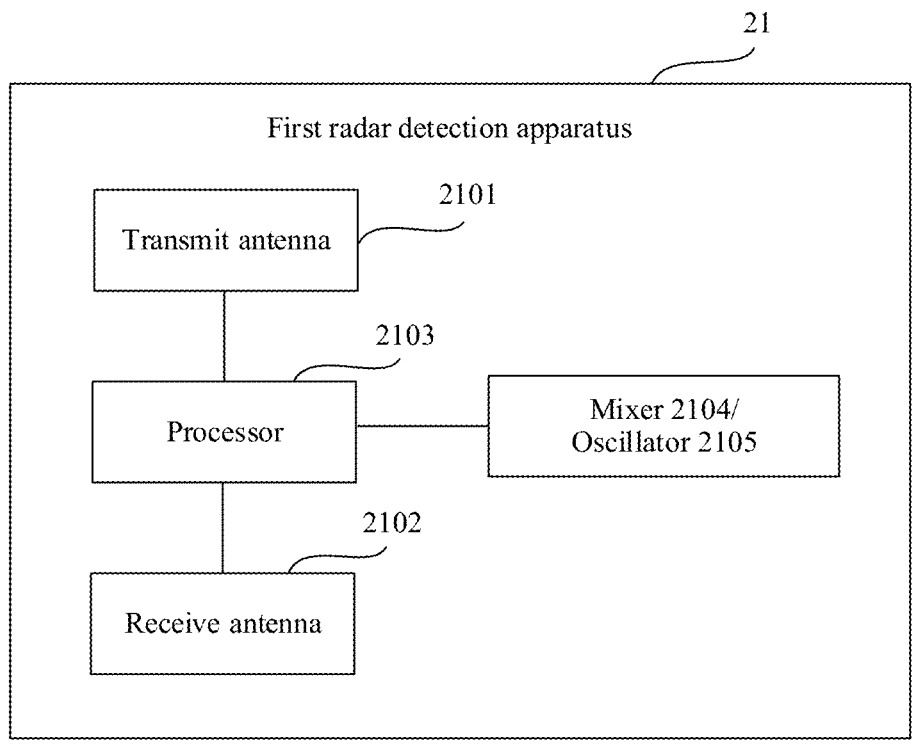
FIG. 21 is a still another schematic structural diagram of a first radar detection apparatus according to an embodiment of this application.

FIG. 2 shows a schematic structural diagram of a radar apparatus. Referring to the foregoing content, another optional manner is proposed. FIG. 21 provides still another possible schematic structural diagram of a first radar detection apparatus. The first radar detection apparatus provided in FIG. 19 to FIG. 21 may be a part or all of a radar apparatus in an actual communication scenario, or may be function modules integrated in the radar apparatus or located outside the radar apparatus, for example, may be a chip system. Specifically, a structure and a composition of the first radar detection apparatus are not specifically limited provided that corresponding functions are implemented.

In this optional manner, the first radar detection apparatus 21 includes a transmit antenna 2101, a receive antenna 2102, and a processor 2103. Further, the first radar detection apparatus further includes a mixer 2104 and/or an oscillator 2105. Further, the first radar detection apparatus 21 may further include a low-pass filter, a coupler, and/or the like. The transmit antenna 2101 and the receive antenna 2102 are configured to support the detection apparatus in radio communication. The transmit antenna 2101 supports radar signal transmission, and the receive antenna 2102 supports radar signal receiving and/or reflected signal receiving, so as to finally implement a detection function. The processor 2103 performs some possible determining and/or processing functions. Further, the processor 2103 further controls operations of the transmit antenna 2101 and/or the receive antenna 2102. Specifically, the transmit antenna 2101 is controlled by the processor 2103 to transmit a signal that needs to be transmitted, and a signal received by the receive antenna 2102 may be transmitted to the processor 2103 for corresponding processing. Components included in the first radar detection apparatus 21 may be configured to cooperate with each other to perform the method provided in the embodiment shown in FIG. 9, FIG. 13, FIG. 15, FIG. 16, or FIG. 18. Optionally, the first radar detection apparatus may further include a memory, configured to store a program instruction and/or data. The transmit antenna 2101 and the receive antenna 2102 may be independently disposed, or may be integrated and disposed as a transceiver antenna, so as to execute a corresponding transceiving function.

Figure 22:
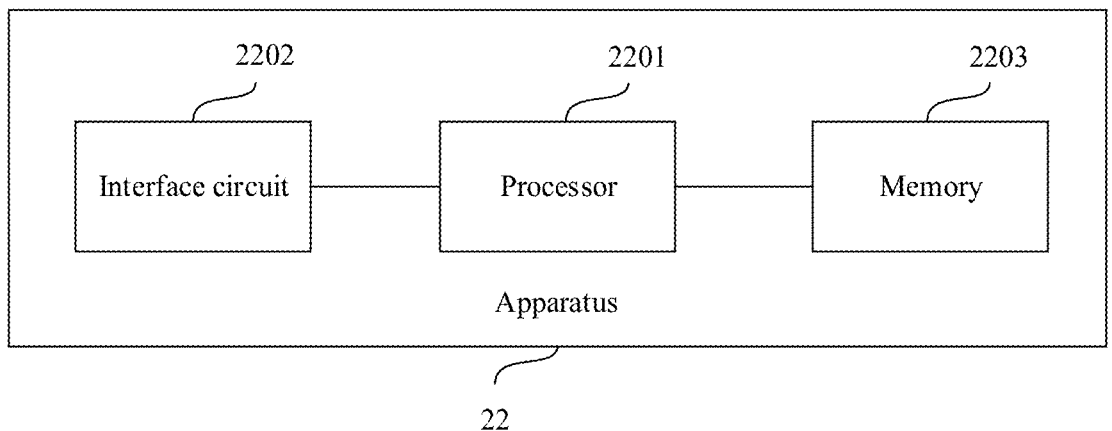
FIG. 22 is a schematic structural diagram of an apparatus according to an embodiment of this application.

FIG. 22 is a schematic structural diagram of an apparatus 22 according to an embodiment of this application. The apparatus 22 shown in FIG. 22 may be a first radar detection apparatus itself, or may be a chip or a circuit that can complete a function of the first radar detection apparatus. For example, the chip or the circuit may be disposed in the first radar detection apparatus. The apparatus 22 shown in FIG. 22 may include a processor 2201 (for example, the processing unit 1901 may be implemented by using the processor 2001, and the processor 2001 and the processor 2201 may be, for example, a same component) and an interface circuit 2202 (for example, the transceiver unit 1902 may be implemented by using the interface circuit 2202, and the transmitter 2002 and the receiver 2003 are, for example, a same component as the interface circuit 2202). The processor 2201 may enable the apparatus 22 to implement the steps performed by the first radar detection apparatus in the method provided in the embodiment shown in FIG. 9, FIG. 13, FIG. 15, FIG. 16, or FIG. 18. Optionally, the apparatus 22 may further include a memory 2203, and the memory 2203 may be configured to store an instruction. The processor 2201 may enable, by executing the instruction stored in the memory 2203, the apparatus 22 to implement the steps performed by the first radar detection apparatus in the method provided in the embodiment shown in FIG. 9, FIG. 13, FIG. 15, FIG. 16, or FIG. 18.

Further, the processor 2201, the interface circuit 2202, and the memory 2203 may communicate with each other by using an internal connection channel, to transfer a control and/or data signal. The memory 2203 is configured to store a computer program. The processor 2201 may invoke and run the computer program from the memory 2203 to control the interface circuit 2202 to receive a signal or send a signal, so as to complete the steps performed by the first radar detection apparatus in the method provided in the embodiment shown in FIG. 9, FIG. 13, FIG. 15, FIG. 16, or FIG. 18. The memory 2203 may be integrated into the processor 2201, or the memory 2203 and the processor 2201 may be disposed separately.

Optionally, if the apparatus 22 is a device, the interface circuit 2202 may include a receiver and a transmitter. The receiver and the transmitter may be a same component, or may be different components. When the receiver and the transmitter are the same component, the component may be referred to as a transceiver.

Optionally, if the apparatus 22 is a chip or a circuit, the interface circuit 2202 may include an input interface and an output interface, and the input interface and the output interface may be a same interface, or may be different interfaces.

Optionally, if the apparatus 22 is a chip or a circuit, the apparatus 22 may not include the memory 2203, and the processor 2201 may read an instruction (a program or a code) in a memory outside the chip or the circuit to implement the steps performed by the first radar detection apparatus in the method provided in the embodiment shown in FIG. 9, FIG. 13, FIG. 15, FIG. 16, or FIG. 18.

Optionally, if the apparatus 22 is a chip or a circuit, the apparatus 22 may include a resistor, a capacitor, or another corresponding function component, and the processor 2201 or the interface circuit 2202 may be implemented by using a corresponding function component.

In an implementation, it may be considered that a function of the interface circuit 2202 is implemented by using a transceiver circuit or a dedicated chip for transceiving. It may be considered that the processor 2201 is implemented by using a dedicated processing chip, a processing circuit, a processor, or a universal chip.

In another implementation, it may be considered that the first radar detection apparatus provided in this embodiment of this application is implemented by using a general-purpose computer. That is, program code for implementing functions of the processor 2201 and the interface circuit 2202 is stored in the memory 2203. The processor 2201 implements the functions of the processor 2201 and the interface circuit 2202 by executing the program code stored in the memory 2203.

The foregoing enumerated functions and actions of each module or unit in the apparatus 22 are merely example descriptions, and each functional unit in the apparatus 22 may be configured to perform each action or processing process performed by the first radar detection apparatus in the embodiment shown in FIG. 9, FIG. 13, FIG. 15, FIG. 16, or FIG. 18. To avoid repetition, detailed descriptions are omitted herein.

When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially implemented. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be noted that the processor 2001 in the embodiments of this application may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

Method or algorithm steps described in combination with the embodiments of this application may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the detection apparatus. Certainly, the processor and the storage medium may exist in the receiving apparatus as discrete components.

It may be understood that FIG. 19 to FIG. 22 show only simplified designs of the first radar detection apparatus. In actual application, the first radar detection apparatus may include any quantity of transmitters, receivers, processors, controllers, memories, and other possible components.

An embodiment of this application further provides a communications system, including a communications apparatus such as at least one radar detection apparatus and/or at least one central node mentioned in the foregoing embodiments of this application. The central node is configured to control driving of a vehicle and/or processing of another radar detection apparatus based on a transmit parameter of the at least one radar detection apparatus. The central node may be located in the vehicle or at another possible location, to implement control.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a universal serial bus (USB) flash drive, a removable hard disk, a ROM, a RAM, a magnetic disk, or an optical disc.

The foregoing descriptions are merely specific implementations of this application, and are not intended to limit the protection scope of this application. Any variation or replacement within the technical scope disclosed in this application shall fall within the protection scope of this application recited in the claims.

What is claimed is:

1. A signal sending method for a radar detection apparatus that comprises one or more processors, the method comprising:
   determining, by the one or more processors, a first transmit parameter of a first radar, wherein the first transmit parameter is a chirp slope; and
   transmitting, by the one or more processors, a signal based on the first transmit parameter, wherein
   the first radar comprises a plurality of transmit antennas, and the first transmit parameter is used to indicate at least one of time intervals or sending start moments of signal transmissions of the plurality of transmit antennas, or the first transmit parameter is used to indicate at least one of frequency spacings or frequency domain start positions of signal sending of the plurality of transmit antennas; and
   updating, by the one or more processors, the first transmit parameter of the first radar from a first value to a second value based on a preset radar adjustment granularity according to the second transmit parameter of at least one second radar, wherein the preset radar adjustment granularity comprises at least one of one pulse repetition time (PRT), one probe frame, a plurality of consecutive probe frames, or an antenna rotation period, wherein the probe frame is a plurality of consecutive PRTs used by a radar to make a measurement, wherein updating the value of the first transmit parameter reduces a probability that a characteristic of a signal transmitted by the first radar is consistent with a characteristic of a signal transmitted by another radar thereby reducing interference.

2. The method according to claim 1, further comprising:
   obtaining, by the one or more processors, first information from a first communications apparatus, wherein
   the first information is used to indicate a second transmit parameter of at least one second radar, and wherein the first transmit parameter is determined based on the second transmit parameter.

3. The method according to claim 2, wherein the first information is further used to indicate at least one of the following information:
   location information of the at least one second radar;
   orientation information of the at least one second radar; or
   an irradiation angle of the at least one second radar.

4. The method according to claim 1, further comprising:
   sending, by the one or more processors, second information to a first communications apparatus, wherein the second information comprises the first transmit parameter.

5. A signal sending method for a first radar that comprises at least three transmit antennas, wherein the at least three transmit antennas comprise a first transmit antenna, a second transmit antenna, and a third transmit antenna, the method comprising:
   determining a first transmit parameter of the first radar wherein the first transmit parameter is a chirp slope; and
   sending signals based on the first transmit parameter by using the at least three transmit antennas;
   updating, the first transmit parameter of the first radar from a first value to a second value based on a preset radar adjustment granularity according to the second transmit parameter of at least one second radar, wherein the preset radar adjustment granularity comprises at least one of one pulse repetition time (PRT), one probe frame, a plurality of consecutive probe frames, or an antenna rotation period, wherein the probe frame is a plurality of consecutive PRTs used by a radar to make a measurement, wherein updating the value of the first transmit parameter reduces a probability that a characteristic of a signal transmitted by the first radar is consistent with a characteristic of a signal transmitted by another radar thereby reducing interference, and
   wherein the at least three transmit antennas send one of
      signals by using time division multiplexing (TDM), and the first transmit parameter is used to indicate start moments of signal transmissions of the at least three transmit antennas, wherein a start moment of a signal transmission of the first transmit antenna and a start moment of a signal transmission of the second transmit antenna are adjacent in a time domain, the start moment of the signal transmission of the second transmit antenna and a start moment of a signal transmission of the third transmit antenna are adjacent in the time domain, and a time interval between the start moment of the signal transmission of the first transmit antenna and the start moment of the signal transmission of the second transmit antenna is different from a time interval between the start moment of the signal transmission of the second transmit antenna and the start moment of the signal transmission of the third transmit antenna; or
      signals by using frequency division multiplexing (FDM), and the first transmit parameter is used to indicate center frequencies of signal transmissions of the at least three transmit antennas, wherein a center frequency of a signal transmission of the first transmit antenna and a center frequency of a signal transmission of the second transmit antenna are adjacent in a frequency domain, the center frequency of the signal transmission of the second transmit antenna and a center frequency of a signal transmission of the third transmit antenna are adjacent in the frequency domain, and a frequency spacing between the center frequency of the signal transmission of the first transmit antenna and the center frequency of the signal transmission of the second transmit antenna is different from a frequency spacing between the center frequency of the signal transmission of the second transmit antenna and the center frequency of the signal transmission of the third transmit antenna.

6. A radar detection apparatus, comprising:
   one or more processors, and
   a non-transitory storage medium in communication with the one or more processors, the non-transitory storage medium configured to store program instructions, wherein, when executed by the one or more processors, the instructions cause the apparatus to perform:
   determining a first transmit parameter of a first radar, wherein the first transmit parameter is a chirp slope; and
   transmitting a signal based on the first transmit parameter, wherein
   the first radar comprises a plurality of transmit antennas, and the first transmit parameter is used to indicate at least one of time intervals or sending start moments of signal transmissions of the plurality of transmit antennas, or the first transmit parameter is used to indicate at least one of frequency spacings or frequency domain start positions of signal sending of the plurality of transmit antennas
   updating, by the one or more processors, the first transmit parameter of the first radar from a first value to a second value based on a preset radar adjustment granularity according to the second transmit parameter of at least one second radar, wherein the preset radar adjustment granularity comprises at least one of one pulse repetition time (PRT), one probe frame, a plurality of consecutive probe frames, or an antenna rotation period, wherein the probe frame is a plurality of consecutive PRTs used by a radar to make a measurement, wherein updating the value of the first transmit parameter reduces a probability that a characteristic of a signal transmitted by the first radar is consistent with a characteristic of a signal transmitted by another radar thereby reducing interference.

7. The radar detection apparatus according to claim 6, wherein the instructions further cause the apparatus to perform:
   obtaining first information from a first communications apparatus, wherein
   the first information is used to indicate a second transmit parameter of at least one second radar, and wherein the first transmit parameter is determined based on the second transmit parameter.

8. The radar detection apparatus according to claim 7, wherein the first information is further used to indicate at least one of the following information:
   location information of the at least one second radar;
   orientation information of the at least one second radar; or
   an irradiation angle of the at least one second radar.

9. The radar detection apparatus according to claim 6, wherein the instructions further cause the apparatus to perform:
   sending second information to a first communications apparatus, wherein the second information comprises the first transmit parameter.

* * * * *